United States Patent
Mizusaki et al.

(10) Patent No.: US 10,989,964 B2
(45) Date of Patent: Apr. 27, 2021

(54) LIQUID CRYSTAL DISPLAY DEVICE

(71) Applicant: SHARP KABUSHIKI KAISHA, Sakai (JP)

(72) Inventors: Masanobu Mizusaki, Sakai (JP); Hiroshi Tsuchiya, Sakai (JP); Katsuya Ogawa, Sakai (JP); Toshiaki Fujihara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 149 days.

(21) Appl. No.: 16/077,016

(22) PCT Filed: Feb. 10, 2017

(86) PCT No.: PCT/JP2017/004836
§ 371 (c)(1),
(2) Date: Aug. 9, 2018

(87) PCT Pub. No.: WO2017/141824
PCT Pub. Date: Aug. 24, 2017

(65) Prior Publication Data
US 2019/0033665 A1    Jan. 31, 2019

(30) Foreign Application Priority Data

Feb. 17, 2016  (JP) .............................. JP2016-028407

(51) Int. Cl.
*G02F 1/1337* (2006.01)
*C08G 73/10* (2006.01)
(Continued)

(52) U.S. Cl.
CPC ..... *G02F 1/133723* (2013.01); *C08G 73/105* (2013.01); *C08G 73/1071* (2013.01);
(Continued)

(58) Field of Classification Search
CPC .......................... C08G 73/105; C08G 73/1071; C09D 179/08; G02F 1/133723; C09K 19/56;
(Continued)

(56) References Cited

U.S. PATENT DOCUMENTS 5,441,768 A  *  8/1995  Law ........................ C23C 16/24
257/E21.414
2011/0222006 A1 * 9/2011 Imanishi ............... G02F 1/1337
349/124

(Continued)

FOREIGN PATENT DOCUMENTS

JP          3671578 B2  *  7/2005
JP       2014-197238 A     10/2014

*Primary Examiner* — Sophie Hon
(74) *Attorney, Agent, or Firm* — ScienBiziP, P.C.

(57) ABSTRACT

The present invention provides a liquid crystal display device that can retain a favorable VHR and a low residual DC voltage and minimize display unevenness such as stains and image sticking, in long-term use at high temperatures. The liquid crystal display device includes a first substrate including a pixel electrode; a second substrate facing the first substrate; a liquid crystal layer sandwiched between the first substrate and the second substrate; an aromatic polyimide-based alignment film disposed on at least one of the first substrate and the second substrate; and a radical generator capable of supplying a radical to the liquid crystal layer upon being irradiated with light, the liquid crystal layer containing a liquid crystal compound with an alkenyl group, the aromatic polyimide-based alignment film containing at least one polymer selected from a polyimide and a polyamic acid and being in no contact with the pixel electrode, the at least one polymer containing an aromatic tetracarboxylic dianhydride monomer unit.

13 Claims, 5 Drawing Sheets

(51) Int. Cl.
  *C09D 179/08* (2006.01)
  *G02F 1/1333* (2006.01)
  *G02F 1/13* (2006.01)
  *C09K 19/30* (2006.01)
  *C09K 19/54* (2006.01)
  *C09K 19/56* (2006.01)
  *G02F 1/01* (2006.01)
  *G02F 1/1343* (2006.01)

(52) U.S. Cl.
  CPC ........ *C09D 179/08* (2013.01); *C09K 19/3003* (2013.01); *C09K 19/542* (2013.01); *C09K 19/56* (2013.01); *G02F 1/0107* (2013.01); *G02F 1/13* (2013.01); *G02F 1/1333* (2013.01); *G02F 1/1337* (2013.01); *G02F 1/1343* (2013.01); *G02F 1/133345* (2013.01); *C09K 2019/301* (2013.01); *C09K 2019/3004* (2013.01); *C09K 2019/548* (2013.01); *C09K 2323/027* (2020.08)

(58) Field of Classification Search
  CPC .............. C09K 19/3003; C09K 19/542; C09K 2019/548; C09K 2019/3004; C09K 2019/301; C09K 2323/027; Y10T 428/1023
  See application file for complete search history.

(56) References Cited

U.S. PATENT DOCUMENTS

| | | | |
|---|---|---|---|
| 2011/0234955 A1* | 9/2011 | Mizusaki | C08G 73/1042 349/123 |
| 2012/0115972 A1* | 5/2012 | Shinano | C08G 59/686 522/11 |
| 2016/0026044 A1* | 1/2016 | Nam | G02F 1/1368 349/42 |

* cited by examiner

LIQUID CRYSTAL DISPLAY DEVICE

TECHNICAL FIELD

The present invention relates to liquid crystal display devices. More specifically, the present invention relates to a liquid crystal display device that is suitable especially as an FFS-mode liquid crystal display device.

BACKGROUND ART

Liquid crystal display devices have rapidly gained widespread use and have been used not only for televisions but also for various applications such as electronic book readers, digital photo frames, industrial appliances, personal computers (PCs), tablet PCs, and smartphones. Since liquid crystal display devices are required to have various properties in these applications, various liquid crystal display modes have been developed.

Examples of the liquid crystal display modes include modes in which liquid crystal molecules are aligned in a direction substantially parallel to the main surfaces of the substrates with no voltage applied, such as the in-plane switching (IPS) mode and the fringe field switching (FFS) mode (hereinafter, such modes are also referred to as horizontal alignment modes). The examples also include modes in which liquid crystal molecules are aligned in a direction substantially perpendicular to the main surfaces of the substrate with no voltage applied, such as the vertical alignment (VA) mode (hereinafter, such modes are also referred to as vertical alignment modes).

Patent Literature 1, for example, discloses an FFS-mode liquid crystal display panel in which the resistance of a common electrode provided with slit openings is decreased and thereby flicker and crosstalk are reduced.

CITATION LIST

Patent Literature

Patent Literature 1: JP 2014-197238 A

SUMMARY OF INVENTION

Technical Problem

Liquid crystal materials used for in-vehicle equipment are required to be in a liquid crystal phase at least within the range of −30° C. to 90° C. and have good response performance. In order to widen this temperature range for the liquid crystal phase, a liquid crystal compound that exhibits a liquid crystal phase especially at high temperatures is necessary. Such a liquid crystal compound exhibiting a liquid crystal phase at high temperatures, however, has a high viscosity at 25° C. and at −30° C., unfortunately lowering the response performance of the liquid crystal material. For better response performance, the viscosity of the liquid crystal material needs to be decreased. Thus, a liquid crystal compound with an alkenyl group has to be introduced into the liquid crystal material.

However, a liquid crystal compound with an alkenyl group reacts with a radical generated by a radical generator such as a radical polymerization initiator. The radical is then transferred to the liquid crystal compound with an alkenyl group as shown in the following Formula 1 to be stable in the liquid crystal layer. The radical transferred to the liquid crystal compound eventually ionizes, decreasing the reliability. In particular, display unevenness such as image sticking or stains is caused by a decrease in voltage holding ratio (VHR) or residual DC voltage.

[Chem. 1]

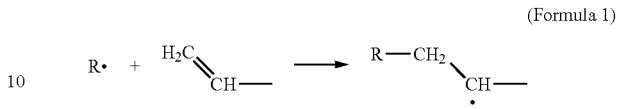

(Formula 1)

FIG. 7 is a schematic plan view of a liquid crystal display device produced by the one drop filling process, on which the present inventors made studies. Especially in the case where the one drop filling (ODF) process utilizing a photo-radical polymerization initiator and a liquid crystal compound with an alkenyl group are used, as shown in FIG. 7, the photo-radical polymerization initiator in an ODF sealing member 80 dissolves into a liquid crystal layer 30 formed by the ODF process. As a result, display unevenness 30a such as image sticking and stains tends to occur around the sealing member 80.

Such display unevenness can occur also in the case of producing a liquid crystal panel by vacuum filling. FIG. 8 is a schematic plan view of a liquid crystal display device produced by vacuum filling, on which the present inventors made studies. A vacuum filling sealing member 82 contains no photo-radical polymerization initiator. The liquid crystal injection ports, however, need to be sealed in a short time in the case of vacuum filling, and are therefore sealed with a liquid crystal injection port sealant containing a photo-radical polymerization initiator for fast curing. In this case, the sealant, uncured, comes into contact with the liquid crystal material upon being applied to the injection ports, so that the photo-radical polymerization initiator in the sealant dissolves into the liquid crystal layer 30. This causes transfer of radicals to the liquid crystal compound with an alkenyl group, leading to the display unevenness 30a such as image sticking and stains around the resulting liquid crystal injection port sealing member 81 as shown in FIG. 8. The vacuum filling sealing member 82 containing no photo-radical polymerization initiator, in contrast, causes no display unevenness such as image sticking and stains around the vacuum filling sealing member 82.

Also in the case of utilizing the polymer sustained alignment (PSA) technique which is known as a technique to control the alignment of liquid crystal compounds, radicals generated by a radical generator such as a residual monomer in the liquid crystal layer are transferred to the liquid crystal compound with an alkenyl group, decreasing the VHR or generating residual DC voltage to cause display unevenness such as image sticking and stains. The PSA technique is a polymer sustained alignment technique which injects a liquid crystal composition containing a polymerizable monomer between paired substrates, polymerizes the polymerizable monomer to form a polymer on the alignment film surface, and stabilizes the initial alignment conditions of the liquid crystal compounds using this polymer.

Image sticking and stains due to VHR decrease and residual DC voltage easily occur when the liquid crystal display device is left at high temperatures because radicals tend to dissolve into the liquid crystal layer.

The object of the invention disclosed in Patent Literature 1 is to provide an FFS-mode liquid crystal display panel with reduced flicker and crosstalk by decreasing the electrical resistance of the common electrode. This object is different from reducing image sticking and stains caused by long-term use of a liquid crystal display device.

The present invention has been made in view of the current state of the art, and aims to provide a liquid crystal display device that can retain a favorable VHR and a low residual DC voltage and minimize display unevenness such as stains and image sticking, in long-term use at high temperatures.

Solution to Problem

The present inventors have focused on the phenomenon that the VHR decreases and residual DC voltage is generated when radicals generated by a radical generator such as a radical polymerization initiator are stably present in the liquid crystal layer in a liquid crystal display device utilizing a liquid crystal compound with an alkenyl group. The present inventors have made studies on the phenomenon, and then found that the above problem can be solved by utilizing an aromatic polyimide-based alignment film containing a polyimide and/or a polyamic acid with an aromatic tetracarboxylic dianhydride monomer unit and arranging the aromatic polyimide-based alignment film such that the film does not come into contact with any pixel electrode. Thereby, the inventors have completed the present invention.

In other words, one aspect of the present invention may be a liquid crystal display device including: a first substrate including a pixel electrode; a second substrate facing the first substrate; a liquid crystal layer sandwiched between the first substrate and the second substrate; an aromatic polyimide-based alignment film disposed on at least one of the first substrate and the second substrate; and a radical generator capable of supplying a radical to the liquid crystal layer upon being irradiated with light, the liquid crystal layer containing a liquid crystal compound with an alkenyl group, the aromatic polyimide-based alignment film containing at least one polymer selected from a polyimide and a polyamic acid and being in no contact with the pixel electrode, the at least one polymer containing an aromatic tetracarboxylic dianhydride monomer unit.

The radical generator may generate a radical upon being irradiated with ultraviolet light or visible light.

The liquid crystal display device may further include a sealing member that contains the radical generator and seals the liquid crystal layer, wherein the sealing member may be disposed on the entire or part of the periphery of the liquid crystal layer.

The radical generator may be contained in the liquid crystal layer.

The liquid crystal layer may be in a liquid crystal phase within a temperature range of −30° C. to 90° C.

The first substrate may further include an insulating film, the aromatic polyimide-based alignment film may be disposed at least on the first substrate, and the insulating film may cover the pixel electrode and may contain no polymer containing an aromatic tetracarboxylic dianhydride monomer unit.

The liquid crystal display device may be a fringe field switching (FFS)-mode liquid crystal display device, the first substrate may further include a counter electrode, and the aromatic polyimide-based alignment film, the counter electrode, the insulating film, and the pixel electrode may be disposed in the given order from the liquid crystal layer side.

The first substrate or the second substrate may include a counter electrode, the aromatic polyimide-based alignment film, the insulating film, and the pixel electrode may be disposed in the given order from the liquid crystal layer side, and the counter electrode may be disposed at a position except between the aromatic polyimide-based alignment film and the insulating film.

The insulating film may contain an inorganic material.

The inorganic material may contain at least one of SiNx and SiOx, where x's are the same as or different from each other and each a real number falling within the range of $1 \leq x \leq 3$.

The liquid crystal display device may further include a second alignment film on the first substrate, wherein the aromatic polyimide-based alignment film may be formed not on the first substrate but on the second substrate, and the second alignment film may contain no polymer containing an aromatic tetracarboxylic dianhydride monomer unit.

The liquid crystal layer may contain, as a liquid crystal compound with an alkenyl group, at least one liquid crystal compound selected from the group consisting of liquid crystal compounds represented by the following formulas (D-1) to (D-4):

[Chem. 2]

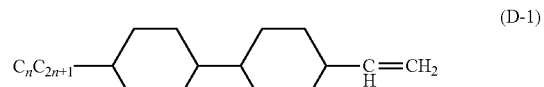

(D-1)

(D-2)

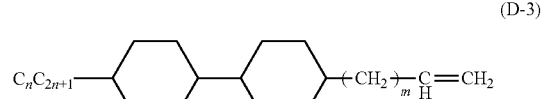

(D-3)

(D-4)

wherein m and n are the same as or different from each other and each an integer of 1 to 6.

The at least one polymer contained in the aromatic polyimide-based alignment film may be a copolymer containing the aromatic tetracarboxylic dianhydride monomer unit and an aliphatic tetracarboxylic dianhydride monomer unit.

The aromatic tetracarboxylic dianhydride monomer unit in the copolymer may account for 20 mol % or more of all anhydride monomer units.

The at least one polymer contained in the aromatic polyimide-based alignment film may contain at least one chemical structure selected from the group consisting of chemical structures represented by the following formulas (X-1) to (X-6) in the aromatic tetracarboxylic dianhydride monomer unit:

[Chem. 3]

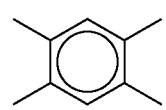

(X-1)

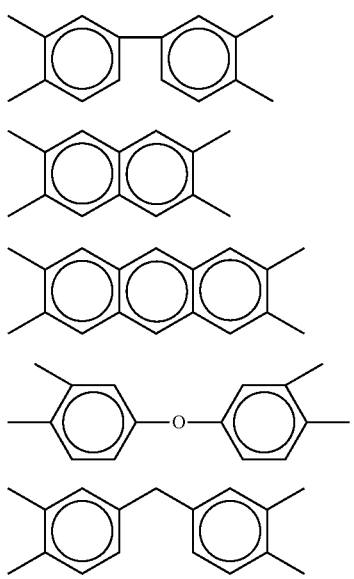

(X-2)

(X-3)

(X-4)

(X-5)

(X-6)

wherein at least one of hydrogen atoms may be replaced by a halogen, methyl, or ethyl group.

The second alignment film may contain at least one polymer selected from a polyimide and a polyamic acid, and the at least one polymer contained in the second alignment film may have an aliphatic anhydride monomer unit.

The aspects of the present invention described above may appropriately be combined within the spirit of the present invention.

Advantageous Effects of Invention

The liquid crystal display device according to any one of the aspects of the present invention described above can retain a favorable VHR and a low residual DC voltage and minimize display unevenness such as stains and image sticking, in long-term use at high temperatures.

DESCRIPTION OF EMBODIMENTS

The present invention is described in more detail based on the following embodiments with reference to the drawings. The embodiments, however, are not intended to limit the scope of the present invention. The configurations in the embodiments may appropriately be combined or modified within the spirit of the present invention.

The concept of the present invention is applicable to both a horizontal alignment mode and a vertical alignment mode, and is particularly preferably applied to a horizontal alignment mode.

Embodiment 1

Figure 1:
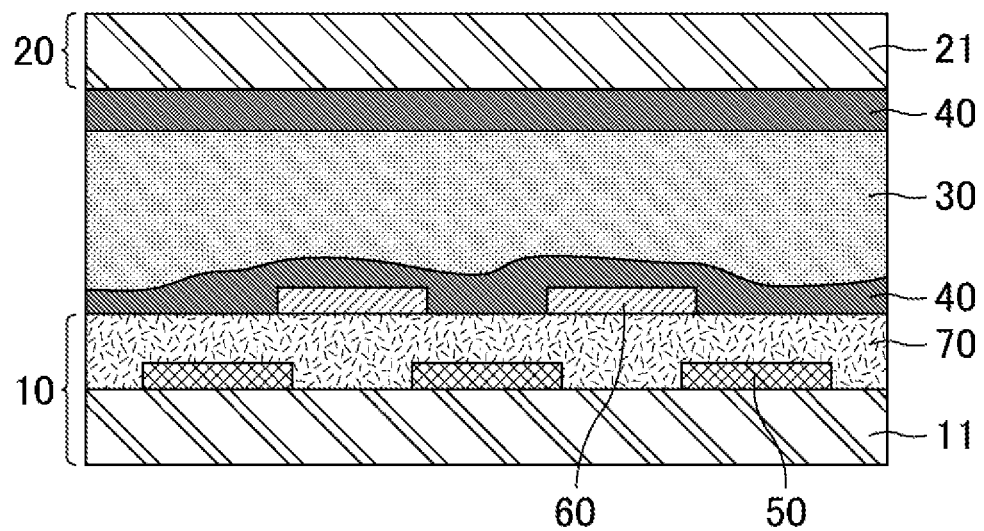
FIG. 1 is a schematic cross-sectional view of a liquid crystal display device of Embodiment 1.

FIG. 1 is a schematic cross-sectional view of a liquid crystal display device of Embodiment 1. As shown in FIG. 1, the liquid crystal display device of the present embodiment includes a first substrate 10, a second substrate 20 facing the first substrate 10, a liquid crystal layer 30 sandwiched between the first substrate 10 and the second substrate 20, aromatic polyimide-based alignment films 40 disposed on the respective substrates 10 and 20, and a radical generator (not illustrated) capable of supplying radicals to the liquid crystal layer 30 upon being irradiated with light. The first substrate 10 includes pixel electrodes 50 corresponding to the respective pixels. The liquid crystal layer 30 contains a liquid crystal compound with an alkenyl group. Each aromatic polyimide-based alignment film 40 contains at least one polymer selected from a polyimide and a polyamic acid (hereinafter, such a polymer is also referred to as an aromatic polyimide-based polymer) and is disposed such that the film does not come into contact with any of the pixel electrodes 50. The aromatic polyimide-based polymer has an aromatic tetracarboxylic dianhydride monomer unit (hereinafter, also referred to as an aromatic anhydride monomer unit). The liquid crystal display device of the present embodiment further includes a backlight (not illustrated) behind the first substrate 10 and the second substrate 20.

The liquid crystal display device of the present embodiment contains a radical generator capable of supplying radicals to the liquid crystal layer 30 upon being irradiated with light. The liquid crystal layer 30 contains a liquid crystal compound with an alkenyl group. This may raise a concern that the VHR may be decreased and residual DC voltage may be generated by radicals ultimately transferred to the liquid crystal compound with an alkenyl group as described above. Yet, in the present embodiment, each aromatic polyimide-based alignment film 40 contains an aromatic polyimide-based polymer that has an aromatic anhydride monomer unit. Such an aromatic anhydride monomer unit can incorporate radicals as shown in the following formula 2 or 3 even when radicals generated by the radical generator and transferred to the liquid crystal compound with an alkenyl group are present in the liquid crystal layer 30. Thereby, floating radicals in the liquid crystal layer 30 can be reduced, so that a high VHR can be achieved while generation of residual DC voltage can be effectively reduced. Also, even when stored for a long period of time in a high-temperature environment, the liquid crystal display device of the present embodiment can retain a favorable VHR while generating low or no residual DC voltage. The liquid crystal display device can thus further reduce image sticking and stains due to a decrease in VHR or generation of residual DC voltage.

[Chem. 4]

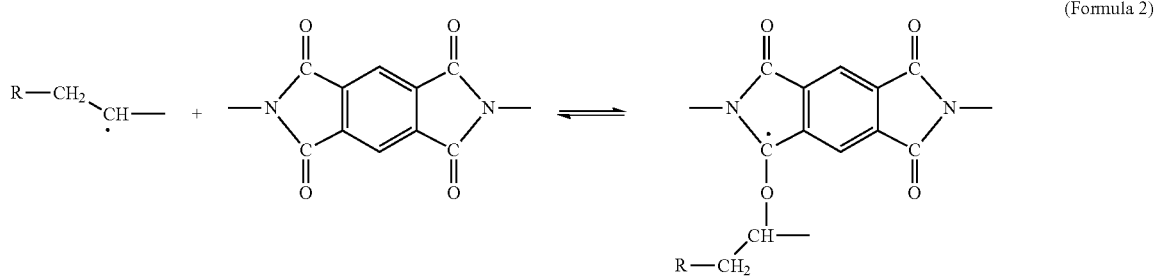

(Formula 2)

[Chem. 5]

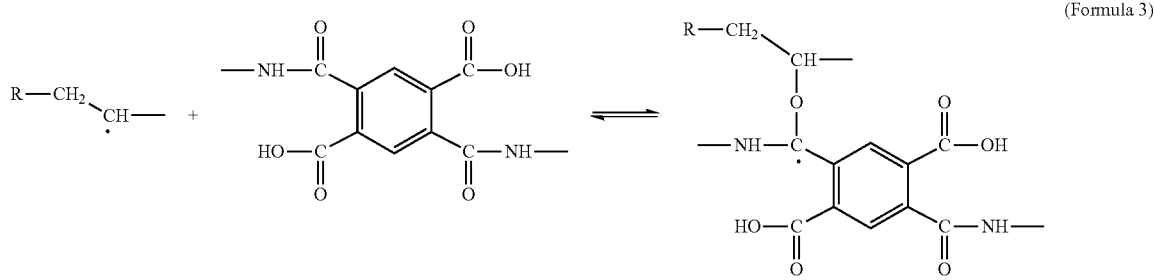

(Formula 3)

In a common alignment film containing at least one polymer selected from a polyimide and a polyamic acid, the polyimide and the polyamic acid each have a structure with repeating units of a tetracarboxylic dianhydride monomer unit and a diamine monomer unit. The tetracarboxylic dianhydride monomer unit is typically an aliphatic tetracarboxylic dianhydride monomer unit. This is because if an aromatic anhydride monomer unit is used as the tetracarboxylic dianhydride monomer unit, charge transfer occurs between the aromatic group and the carbonyl group to cause a redox reaction as shown in the following formula 4 or 5 at an interface between a pixel electrode and the alignment film, forming ions (anions) and decreasing the VHR. In contrast, an aliphatic tetracarboxylic dianhydride monomer unit does not cause such a redox reaction, and therefore causes no decrease in the VHR.

In the present embodiment, as described above, the aromatic polyimide-based polymer contained in each aromatic polyimide-based alignment film 40 has an aromatic anhydride monomer unit. The aromatic polyimide-based alignment film 40 is disposed such that it does not come into contact with any of the pixel electrodes 50. This configuration can prevent generation of ions from the redox reaction between the aromatic polyimide-based alignment film 40 and the pixel electrodes 50 and a decrease in the VHR caused by the ions.

Patent Literature 1, in contrast, neither discloses nor suggests the relationship between a configuration as in the present embodiment described above and the effects thereof.

<Substrate>

The first substrate 10 is preferably an active matrix substrate (TFT substrate). The active matrix substrate can be

[Chem. 6]

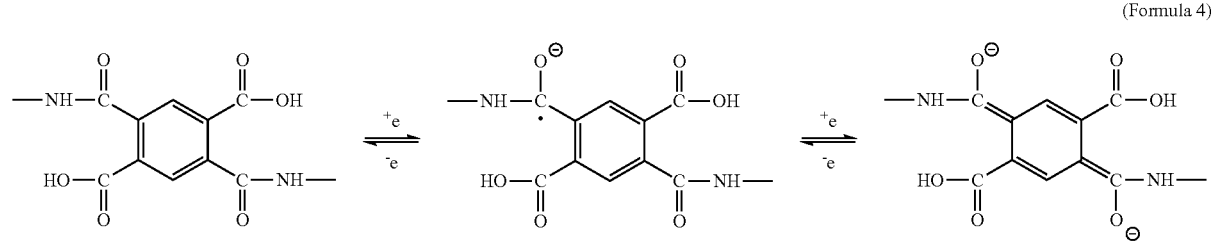

(Formula 4)

[Chem. 7]

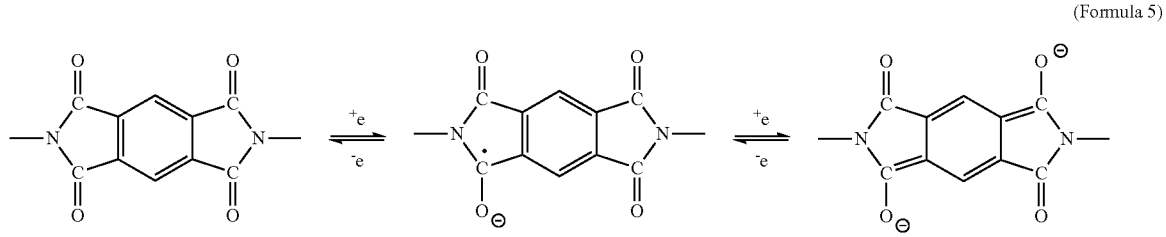

(Formula 5)

one usually used in the field of liquid crystal display devices. The active matrix substrate has, in a plan view thereof, a configuration including, on a transparent substrate 11 such as a glass substrate, components such as parallel gate signal lines (not illustrated); parallel source signal lines (not illustrated) that extend in the direction perpendicular to the gate signal lines; active elements such as thin-film transistors (TFTs) (not illustrated) disposed at the respective intersections of the gate signal lines and the source signal lines; and pixel electrodes 50 disposed in the respective regions defined by the gate signal lines and the source signal lines in a matrix form. In a horizontal alignment mode, as shown in FIG. 1, the configuration may further include a common conductive line (not illustrated); a counter electrode 60 that is connected to the common conductive line and applies common voltage to pixels (which may be all the pixels); and an interlayer insulating film 70 disposed between the pixel electrodes 50 and the counter electrode 60.

The TFTs each preferably include a channel layer formed from an amorphous silicon, polysilicon, or indium-gallium-zinc-oxygen (IGZO) which is an oxide semiconductor. In particular, an oxide semiconductor producing a low off-leakage current is advantageous in low frequency driving of a liquid crystal display device. The low frequency driving, however, cannot be conducted when the VHR is low. The present embodiment can increase the VHR and thus can employ low frequency driving. In other words, an oxide semiconductor and the present embodiment make a particularly preferred combination.

In an active matrix-type display mode, usually, a signal voltage is applied to the pixel electrode 50 in each pixel through the corresponding TFT when the TFT is turned on, and the electric charge charged in the pixel is held while the TFT is turned off. The ratio of the charged electric charge held during one frame (e.g., 16.7 ms) is a voltage holding ratio (VHR). In other words, a low VHR means that voltage applied to the liquid crystal layer 30 is likely to be attenuated with time. In an active matrix-type display mode, the VHR is required to be high.

The second substrate 20 may be a color filter substrate. The color filter substrate can be one usually used in the field of liquid crystal display devices. The color filter substrate has, for example, a configuration including, on a transparent substrate 21, components such as a black matrix (not illustrated) formed in a grid pattern; and color filters formed in the respective cells of the grid (in the respective pixels).

The color filters may be formed on the first substrate 10, not on the second substrate 20.

<Liquid Crystal Layer>

The liquid crystal layer 30 is usually formed from a liquid crystal material (liquid crystal composition) containing a liquid crystal compound with an alkenyl group and one or more liquid crystal compounds other than the liquid crystal compound with an alkenyl group. The liquid crystal compound with an alkenyl group can decrease the viscosity of the liquid crystal material and improve the response performance of the liquid crystal material (i.e., improve the response performance of the liquid crystal display device). Thus, a liquid crystal compound exhibiting a liquid crystal phase at a high temperature and exhibiting a high viscosity at a low temperature can be introduced into the liquid crystal material, so that the liquid crystal material has good response performance and exhibits a liquid crystal phase in a wide range of temperatures. Specifically, the liquid crystal layer 30 is preferably in a liquid crystal phase (typically a nematic liquid crystal phase) at a temperature falling within the range of −30° C. to 90° C. With such a liquid crystal layer, the liquid crystal display device of the present embodiment can be suitable for use in automobiles, ships and boats, and aircraft, for example. The upper limit and the lower limit of the temperature at which the liquid crystal material is in a liquid crystal phase can be determined based on the nematic-isotropic phase transition temperature of the liquid crystal material. Herein, the nematic-isotropic phase transition temperature of the liquid crystal material is determined by differential scanning calorimetry (DSC) or by a technique of placing the liquid crystal material in a capillary to directly observe the phase transition caused by temperature change.

The liquid crystal compound with an alkenyl group contained in the liquid crystal layer 30 may be a compound in which a group represented by the following formula (C-1) or (C-2) is directly bonded to a mesogen group.

[Chem. 8]

In the formula, p represents an integer of 0 to 6.

[Chem. 9]

In the formula, q represents an integer of 1 to 6.

The mesogen group is a rigid, high-orientation group necessary in a compound exhibiting a liquid crystal phase, and is preferably a group with two or more ring structures bonded to each other directly or via a linking group, more preferably a group with two or more benzene- and/or cyclohexane-derived groups bonded to each other directly or via a linking group. The benzene-derived group means a group obtained by abstracting at least one of hydrogen atoms from an aromatic ring in benzene or a benzene derivative. The cyclohexane-derived group means a group obtained by abstracting at least one of hydrogen atoms from an aliphatic ring in cyclohexane or a cyclohexane derivative. Examples of the linking group include ether groups and ester groups.

The liquid crystal layer 30 preferably contains, as a liquid crystal compound with an alkenyl group, at least one liquid crystal compound selected from the group consisting of liquid crystal compounds represented by the following respective formulas (D-1) to (D-4):

[Chem. 10]

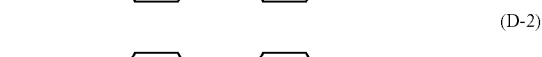

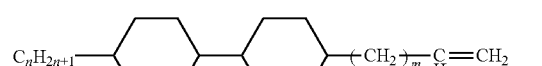

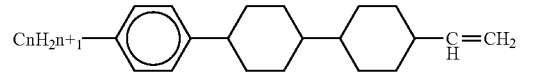

wherein m and n are the same as or different from each other and each an integer of 1 to 6.

Specific examples of the liquid crystal compound represented by the formula (D-1) include liquid crystal compounds represented by the following formula (D-1-1).

[Chem. 11]

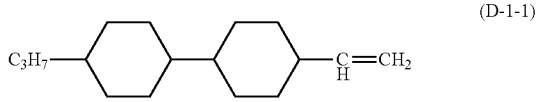

(D-1-1)

The amount of the liquid crystal compound with an alkenyl group in the liquid crystal layer 30 is not particularly limited. The amount can appropriately be determined according to the use of the liquid crystal display device of the present embodiment and may be a typical amount for the use.

The anisotropy (Δε) of dielectric constant of each liquid crystal compound defined by the following formula (L) may be negative or positive. In other words, each liquid crystal compound may have negative anisotropy of dielectric constant or positive anisotropy of dielectric constant. The liquid crystal compound having negative anisotropy of dielectric constant can be, for example, one having an anisotropy Δε of −1 to −20. The liquid crystal compound having positive anisotropy of dielectric constant can be, for example, one having an anisotropy Δε of 1 to 20. The liquid crystal layer 30 may further contain a liquid crystal compound having no polarity, i.e., having an anisotropy Δε of substantially 0 (neutral liquid crystal compound). Examples of the neutral liquid crystal compound include liquid crystal compounds containing an alkene and liquid crystal compounds having an alkene structure.

Δε=(dielectric constant in major axis direction)−(dielectric constant in minor axis direction)(L)

In conventional liquid crystal display devices, a liquid crystal compound having negative anisotropy of dielectric constant tends to cause defects such as image sticking and stains in a more significant manner than a liquid crystal compound having positive anisotropy of dielectric constant. This is presumed to be due to a greater polarization of a liquid crystal compound having negative anisotropy of dielectric constant in the minor axis direction, which increases the influence of VHR decrease when the compound is ionized. In other words, the liquid crystal display device of the present embodiment achieves a more significant effect when it contains a liquid crystal compound having negative anisotropy of dielectric constant than when it contains a liquid crystal compound having positive anisotropy of dielectric constant. Yet, in designing a liquid crystal material in a liquid crystal phase at high temperatures, liquid crystal compounds having positive anisotropy of dielectric constant are more advantageous than liquid crystal compounds having negative anisotropy of dielectric constant.

<Alignment Film>

Alignment films such as the aromatic polyimide-based alignment films 40 and a second alignment film described below have a function of controlling the alignment of the liquid crystal compounds in the liquid crystal layer 30. When the voltage applied to the liquid crystal layer 30 is less than the threshold voltage (including no voltage application), the alignment of the liquid crystal compounds in the liquid crystal layer 30 is mainly controlled by the function of the alignment films. In this state (hereinafter, also referred to as an initial alignment state), the angle formed by the major axis of a liquid crystal compound and the surface of the substrate 10 or 20 is called a "pre-tilt angle". The "pre-tilt angle" as used herein means the angle of inclination of a liquid crystal compound molecule from the direction parallel to the substrate surface, with the angle parallel to the substrate surface being 0° and the angle of the direction normal to the substrate surface being 90°.

The alignment films may give any pre-tilt angle to the liquid crystal compounds in the present embodiment. The alignment films may align the liquid crystal compounds in the liquid crystal layer 30 in a substantially horizontal direction (may be horizontal alignment films) or align the liquid crystal compounds in the liquid crystal layer 30 in a substantially vertical direction (may be vertical alignment films). In the case of horizontal alignment films and horizontal alignment modes, the expression "substantially horizontal" preferably means that the pre-tilt angle is 0° or greater and 5° or smaller. In the case where the display mode is the IPS mode or FFS mode, the pre-tilt angle is preferably 0° from the viewpoint of the viewing angle characteristics. In the case where the display mode is the TN mode, the pre-tilt angle is set to, for example, about 2° due to restrictions in the mode. In the case of vertical alignment films and vertical alignment modes, the expression "substantially vertical" means that the pre-tilt angle is preferably 85° or greater and 90° or smaller. As described above, the present embodiment is applicable to both horizontal alignment modes and vertical alignment modes, but is particularly preferably used in a horizontal alignment mode.

Each alignment film may have any thickness appropriately set, but preferably has a thickness of 50 nm or greater and 200 nm or smaller, more preferably 60 nm or greater and 150 nm or smaller. If the alignment film has a thickness smaller than 50 nm, the alignment film formed on the entire substrate may not be uniform. If the alignment film has a thickness greater than 200 nm, the surface of the alignment film tends to be uneven, which may vary the pre-tilt angle of the liquid crystal compound, causing display unevenness.

<Aromatic Polyimide-Based Alignment Film>

Each aromatic polyimide-based alignment film 40 contains at least one polymer (aromatic polyimide-based polymer) selected from a polyimide and a polyamic acid. The polyimide which may be contained in the aromatic polyimide-based alignment film 40 may be one obtained by partially imidizing a polyamic acid, i.e., a polyimide partially having a polyamic acid structure, or may be one obtained by completely imidizing a polyamic acid, i.e., a polyimide having no polyamic acid structure.

Each aromatic polyimide-based alignment film 40 is disposed such that it does not come into contact with any of the pixel electrodes 50. This structure enables prevention of a redox reaction between the aromatic polyimide-based alignment film 40 and the pixel electrode 50. The specific structures of these components are described below.

The aromatic polyimide-based polymer is a polymer having a structure with repeating units of a tetracarboxylic dianhydride monomer unit and a diamine monomer unit, and is obtained by polymerizing at least one tetracarboxylic dianhydride and at least one diamine. The tetracarboxylic dianhydride essentially includes at least one aromatic tetracarboxylic dianhydride. The aromatic polyimide-based polymer therefore has an aromatic tetracarboxylic dianhydride monomer unit (aromatic anhydride monomer unit) as the tetracarboxylic dianhydride monomer unit. The diamine may be any diamine such as a diamine used for a common polyimide-based alignment film.

The aromatic tetracarboxylic dianhydride monomer unit is a structural unit having a structure derived from an aromatic tetracarboxylic dianhydride among structural units derived from a monomer constituting the polymer.

Specifically, the aromatic tetracarboxylic dianhydride monomer unit is a structure represented by the following formula (M-1) or the following formula (M-2), and the aromatic polyimide-based polymer has a polyamic acid structure represented by the following formula (P-1) and/or a polyimide structure represented by the following formula (P-2).

[Chem. 12]

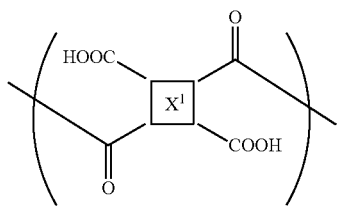

(M-1)

In the formula, $X^1$ represents a tetravalent aromatic group.

[Chem. 13]

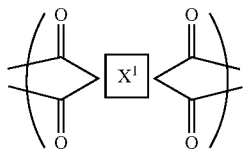

(M-2)

In the formula, $X^1$ represents a tetravalent aromatic group.

[Chem. 14]

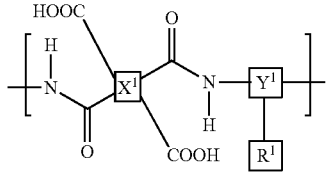

(P-1)

In the formula, $X^1$ represents a tetravalent aromatic group, $Y^1$ represents a trivalent aromatic or aliphatic group, and $R^1$ represents a monovalent organic group or a hydrogen atom.

[Chem. 15]

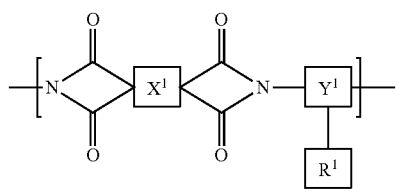

(P-2)

In the formula, $X^1$ represents a tetravalent aromatic group, $Y^1$ represents a trivalent aromatic or aliphatic group, and $R^1$ represents a monovalent organic group or a hydrogen atom.

In the formulas (M-1), (M-2), (P-1), and (P-2), $X^1$ represents a tetravalent aromatic group, preferably a C6 to C20 tetravalent aromatic group, more preferably a C6 to C15 tetravalent aromatic group. $X^1$ preferably includes one to three C6 aromatic rings (ring structures derived from benzene). In the case where $X^1$ includes two or more aromatic rings, the aromatic rings may be bonded to each other directly or via a linking group or may be condensed. Examples of the linking group include ether groups and C1 to C5 hydrocarbon groups.

Specific examples of $X^1$ include chemical structures represented by the following respective formulas (X-1) to (X-6). At least one of hydrogen atoms in each structure may be replaced by a halogen, a methyl group, or an ethyl group. In the following formulas (X-1) to (X-6), each bond with no symbol is a bond to a carbonyl group.

[Chem. 16]

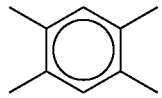

(X-1)

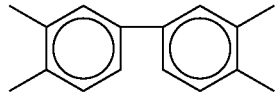

(X-2)

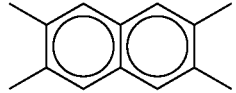

(X-3)

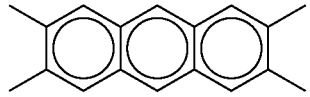

(X-4)

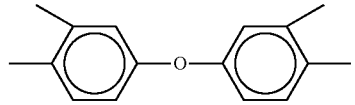

(X-5)

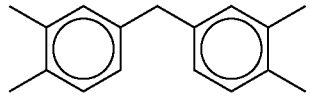

(X-6)

$Y^1$ in the formulas (P-1) and (P-2) represents a trivalent aromatic or aliphatic group, preferably a C6 to C20 trivalent aromatic or aliphatic group, more preferably a C6 to O15 trivalent aromatic or aliphatic group. $Y^1$ preferably has one to three C6 aromatic rings (ring structures derived from benzene). In the case where $Y^1$ has two or more aromatic rings, the aromatic rings may be bonded to each other directly or via a linking group or may be condensed. Examples of the linking group include ether groups and C1 to C5 hydrocarbon groups.

Specific examples of $Y^1$ include the following formulas (Y-1) to (Y-16). At least one of hydrogen atoms in each structure may be replaced by a halogen, a methyl group, or an ethyl group. In the formulas (Y-1) to (Y-16), each bond with a symbol "*" is a bond to $R^1$ and the other bonds with no symbol are each a bond to an amide group or an imide group.

[Chem. 17]

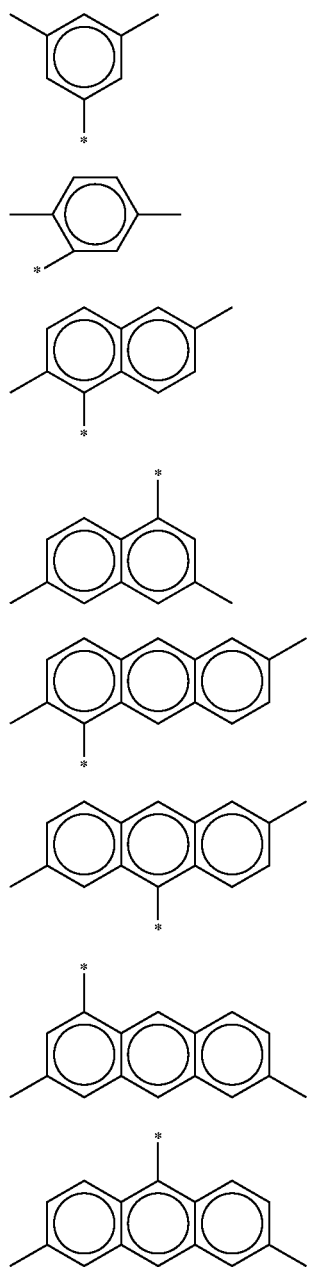

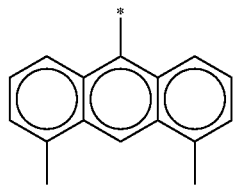

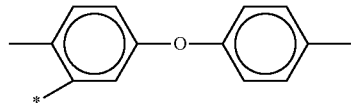

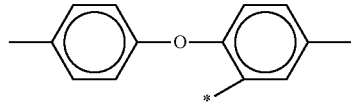

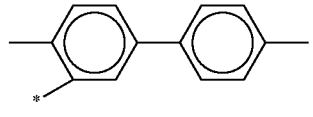

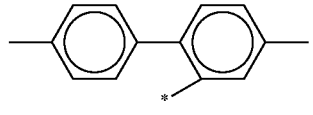

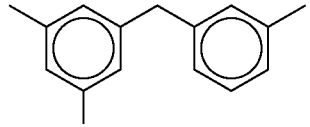

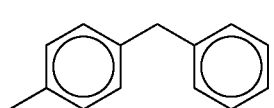

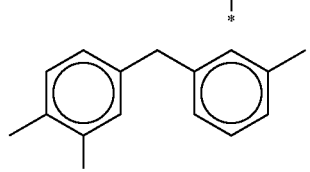

$R^1$ in the formulas (P-1) and (P-2) represents a monovalent organic group or a hydrogen atom. Examples of the monovalent organic group include C1 to C10 alkyl groups and groups represented by —COO—Z. In particular, groups represented by —COO—Z are preferred. In a group represented by —COO—Z, Z is a structure represented by any one of the following formulas (Z-1) to (Z-8). At least one of hydrogen atoms in each structure may be replaced by a halogen, a methyl group, or an ethyl group. In the following formulas (Z-1) to (Z-8), each bond with no symbol is a bond to an ester group. In the following formulas (Z-7) and (Z-8), the methyl group may be bonded to any carbon atom in the ring structure.

[Chem. 18]

—H    (Z-1)

-continued

 (Z-2)

 (Z-3)

 (Z-4)

(Z-5)

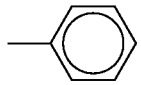

(Z-6)

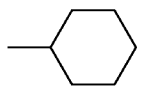

(Z-7)

(Z-8)

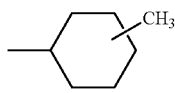

In one molecule of the aromatic polyimide-based polymer, $X^1$, $Y^1$, and $R^1$ may each be of one kind or two or more kinds.

The aromatic polyimide-based polymer preferably has a polyamic acid structure represented by the following formula (Q-1) and/or a polyimide structure represented by the following formula (Q-2).

[Chem. 19]

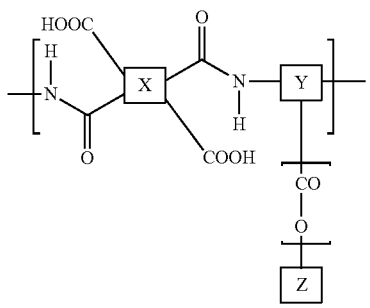 (Q-1)

In the formula, X represents a tetravalent aromatic group, Y represents a trivalent aromatic or aliphatic group, and Z represents a monovalent organic group or a hydrogen atom.

[Chem. 20]

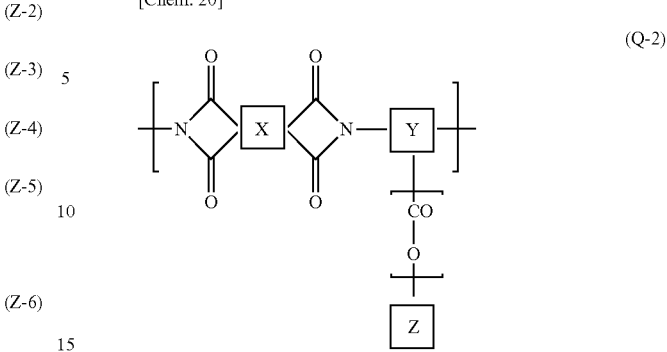 (Q-2)

In the formula, X represents a tetravalent aromatic group, Y represents a trivalent aromatic or aliphatic group, and Z represents a monovalent organic group or a hydrogen atom.

X in the formulas (Q-1) and (Q-2) is a structure represented by any one of the formulas (X-1) to (X-6). At least one of hydrogen atoms in each structure may be replaced by a halogen, a methyl group, or an ethyl group. In the formulas (X-1) to (X-6), each bond with no symbol is a bond to a carbonyl group.

Y in the formulas (Q-1) and (Q-2) is a structure represented by any one of the formulas (Y-1) to (Y-16). At least one of hydrogen atoms in each structure may be replaced by a halogen, a methyl group, or an ethyl group. In the formulas (Y-1) to (Y-16), each bond with a symbol "*" is a bond to an ester group and the other bonds with no symbol are each a bond to an amide group or an imide group.

Z in the formulas (Q-1) and (Q-2) is a structure represented by any one of the formulas (Z-1) to (Z-8). At least one of hydrogen atoms in each structure may be replaced by a halogen, a methyl group, or an ethyl group. In the formulas (Z-1) to (Z-8), each bond with no symbol is a bond to an ester group. In the formulas (Z-7) and (Z-8), the methyl group may be bonded to any carbon atom in the ring structure.

In one molecule of the aromatic polyimide-based polymer, X, Y, and Z may each be of one kind or two or more kinds.

In one molecule of the aromatic polyimide-based polymer, the tetracarboxylic dianhydride monomer unit and the diamine monomer unit may each be of one kind or two or more kinds. Specifically, a preferred example of an aromatic polyimide-based polymer having two or more kinds of tetracarboxylic dianhydride monomer units is a copolymer having an aromatic anhydride monomer unit and an aliphatic anhydride monomer unit. In the copolymer, the aromatic anhydride monomer unit accounts for preferably 20 mol % or more (more preferably 25 mol % or more and less than 100 mol %) of all tetracarboxylic dianhydride monomer units. This configuration allows the liquid crystal display device to more effectively minimize image sticking and stains due to VHR decrease and residual DC voltage in long-term use at high temperatures. Specifically, the copolymer is more preferably one represented by the following formula (S-1) and/or formula (S-2).

[Chem. 21]

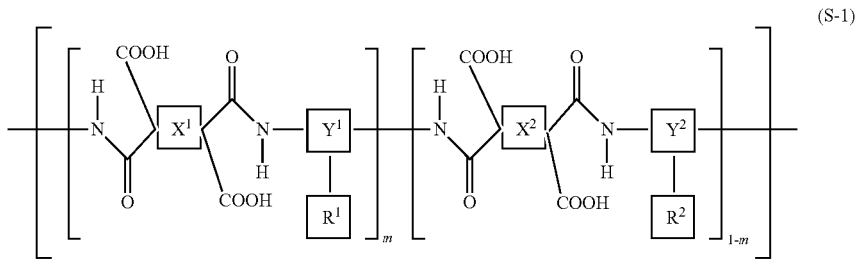
(S-1)

In the formula, $X^1$ represents a tetravalent aromatic group, $X^2$ represents a tetravalent aliphatic group, $Y^1$ and $Y^2$ each independently represent a trivalent aromatic or aliphatic group, and $R^1$ and $R^2$ each independently represent a monovalent organic group or a hydrogen atom.

[Chem. 22]

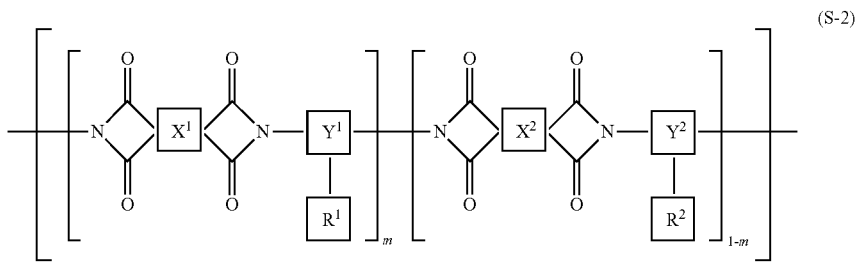
(S-2)

In the formula, $X^1$ represents a tetravalent aromatic group, $X^2$ represents a tetravalent aliphatic group, $Y^1$ and $Y^2$ each independently represent a trivalent aromatic or aliphatic group, and $R^1$ and $R^2$ each independently represent a monovalent organic group or a hydrogen atom.

$X^2$ in the formulas (S-1) and (S-2) is a tetravalent aliphatic group, preferably a C6 to C20 tetravalent aliphatic group, more preferably a C6 to C15 tetravalent aliphatic group. $X^2$ preferably includes one to three C4 to C6 alicyclic structures. In the case where $X^2$ includes two or more alicyclic structures, the alicyclic structures may be bonded to each other directly or via a linking group or may be condensed. Examples of the linking group include ether groups and C1 to C5 hydrocarbon groups.

Specific examples of $X^2$ include structures represented by the following formulas (X-7) to (X-13). At least one of hydrogen atoms in each structure may be replaced by a halogen, a methyl group, or an ethyl group. In the formulas (X-7) to (X-13), each bond with no symbol is a bond to a carbonyl group.

[Chem. 23]

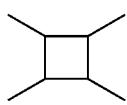
(X-7)

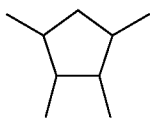
(X-8)

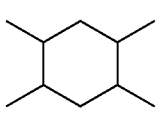
(X-9)

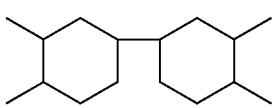
(X-10)

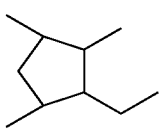
(X-11)

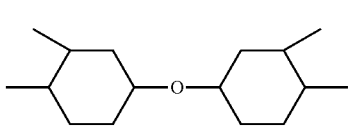
(X-12)

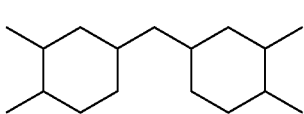
(X-13)

$Y^2$ in the formulas (S-1) and (S-2) represents a trivalent aromatic or aliphatic group, preferably a C6 to C20 trivalent aromatic or aliphatic group, more preferably a C6 to C15 trivalent aromatic or aliphatic group. $Y^2$ preferably has one to three C6 aromatic rings (ring structures derived from benzene). In the case where $Y^2$ has two or more aromatic rings, the aromatic rings may be bonded to each other directly or via a linking group or may be condensed. Examples of the linking group include ether groups and C1 to C5 hydrocarbon groups.

Specific examples of $Y^2$ include the formulas (Y-1) to (Y-16). At least one of hydrogen atoms in each structure may be replaced by a halogen, a methyl group, or an ethyl group. In the formulas (Y-1) to (Y-16), each bond with a symbol "*" is a bond to $R^2$ and the other bonds with no symbol are each a bond to an amide group or an imide group.

$R^2$ in the formulas (S-1) and (S-2) represents a monovalent organic group or a hydrogen atom. Examples of the monovalent organic group include C1 to C10 alkyl groups and groups represented by —COO—Z. In particular, groups represented by —COO—Z are preferred. In a group represented by —COO—Z, Z is a structure represented by any one of the formulas (Z-1) to (Z-8). At least one of hydrogen atoms in each structure may be replaced by a halogen, a methyl group, or an ethyl group. In the formulas (Z-1) to (Z-8), each bond with no symbol is a bond to an ester group. In the formulas (Z-7) and (Z-8), the methyl group may be bonded to any carbon atom in the ring structure.

$X^1$, $Y^1$, and $R^1$ in the formulas (S-1) and (S-2) are the same as $X^1$, $Y^1$, and $R^1$ in the formulas (P-1) and (P-2).

In one molecule of the aromatic polyimide-based polymer, $X^1$, $X^2$, $Y^1$, $Y^2$, $R^1$, and $R^2$ may each be of one kind or two or more kinds.

In the formulas (S-1) and (S-2), m is a real number falling within the range of $0<m<1$, preferably within the range of $0.2 \leq m<1$, more preferably within the range of $0.25 \leq m<1$. With m falling within the above range, the liquid crystal display device can more effectively minimize image sticking and stains due to VHR decrease and residual DC voltage in long-term use at high temperatures.

The aromatic polyimide-based alignment films 40 may each contain one kind or multiple kinds of aromatic polyimide-based polymers.

The aromatic polyimide-based polymer preferably has a weight average molecular weight of 2500 or more and 1000000 or less. The aromatic polyimide-based polymer having a weight average molecular weight of more than 1000000 may increase the viscosity of the liquid crystal alignment agent to a level that leads to failure of film formation. The weight average molecular weight can be determined by gel permeation chromatography (GPC).

The alignment treatment method for the aromatic polyimide-based alignment films 40 may be any method such as rubbing or photo-alignment treatment.

<Radical Generator>

The liquid crystal display device of the present invention contains a radical generator capable of supplying radicals to the liquid crystal layer 30 upon being irradiated with light. The radical generator may be a photo-radical polymerization initiator or a polymerizable monomer generating radicals, for example. The radical generator may be present anywhere in the liquid crystal display device, but is typically present in the liquid crystal layer 30 and/or in a member adjacent to the liquid crystal layer 30. In the case where the radical generator is present in the liquid crystal layer 30, the radical generator can turn into radicals in the liquid crystal layer 30 when irradiated with light from the backlight or external light. In the case where the radical generator is present in a member adjacent to the liquid crystal layer 30, the radical generator, when irradiated with light from the backlight or external light, may dissolve into the liquid crystal layer 30 from the member adjacent to the liquid crystal layer 30 and then turn into radicals, or may turn into radicals in the member adjacent to the liquid crystal layer 30 and then dissolve into the liquid crystal layer 30. The radical generator preferably generates radicals when irradiated with ultraviolet light or visible light. The "ultraviolet light" as used herein refers to light (electromagnetic waves) having a wavelength of 200 nm or longer and shorter than 380 nm. The "visible light" as used herein refers to light (electromagnetic waves) having a wavelength of 380 nm or longer and shorter than 800 nm.

The radical generator may be contained in the liquid crystal layer 30. The radical generator in the liquid crystal layer 30 may be a photo-radical polymerization initiator dissolved into the liquid crystal layer 30 from a sealing member described later, or may be a photo-radical polymerization initiator added to the liquid crystal material together with a polymerizable monomer in the case of employing the PSA technique, for example. In other words, in the present embodiment, a polymer layer may be formed on the surface of each aromatic polyimide-based alignment film 40, and the polymer layer may contain a polymer obtained by polymerizing the polymerizable monomer using a photo-radical polymerization initiator. The polymerizable monomer may be a polymerizable monomer that generates radicals when irradiated with light. In this case, a polymerizable monomer that generates radicals when irradiated with light also functions as a radical generator. In the case of employing the PSA technique, the present embodiment is effective especially on radicals generated by residual monomers in the liquid crystal layer 30.

The amount of the radical generator is not particularly limited. The amount can appropriately be determined depending on the use of the member containing the radical generator, and may be a common amount for the use. In the case of employing the PSA technique, the liquid crystal material preferably contains 0.05 wt % or less photo-radical polymerization initiator.

<Sealing Member>

Figure 2:
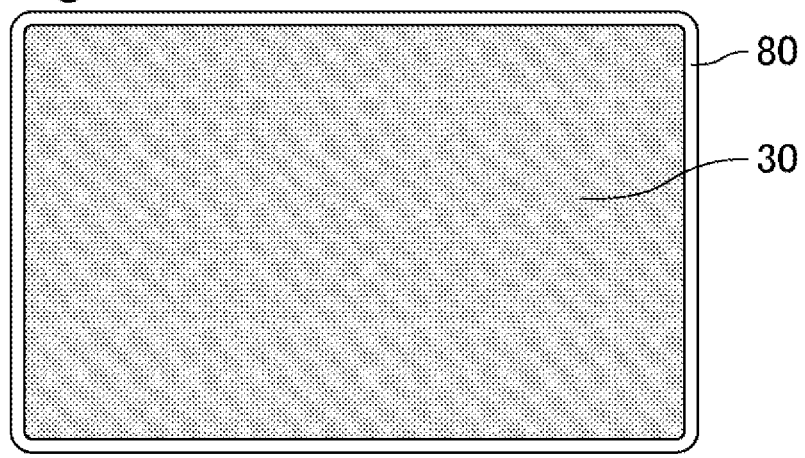
FIG. 2 is a schematic plan view of a liquid crystal display device of Embodiment 1 produced by the ODF process.
Figure 3:
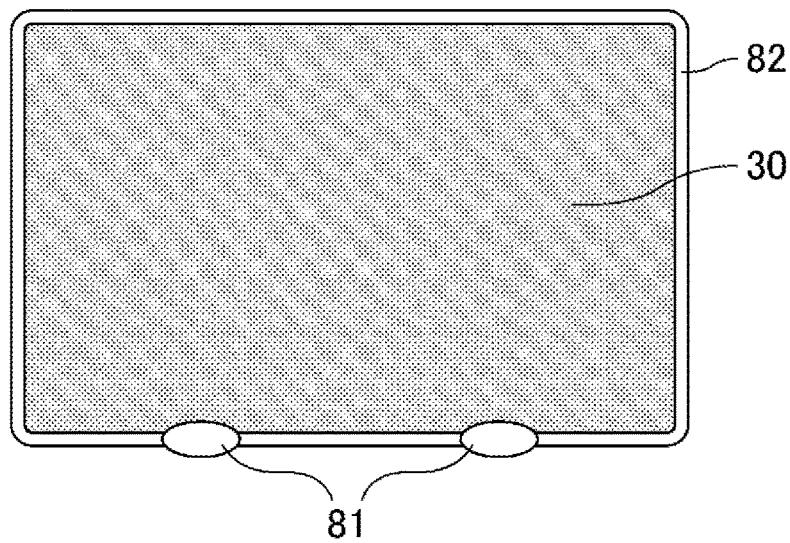
FIG. 3 is a schematic plan view of a liquid crystal display device of Embodiment 1 produced by vacuum filling.

FIG. 2 is a schematic plan view of a liquid crystal display device of Embodiment 1 produced by the ODF process. FIG. 3 is a schematic plan view of a liquid crystal display device of Embodiment 1 produced by vacuum filling.

As shown in FIGS. 2 and 3, the liquid crystal display device of the present embodiment contains a radical generator, and may include a sealing member 80 or 81 that seals the liquid crystal layer 30.

The sealing member 80 is provided on the entire of the periphery of the liquid crystal layer 30 as shown in FIG. 2, while the sealing member 81 is provided on part (liquid crystal injection ports) of the periphery of the liquid crystal layer 30 as shown in FIG. 3. Preferred examples of a liquid crystal panel with the sealing member 80 provided on the entire of the periphery of the liquid crystal layer 30 include a liquid crystal panel produced by the ODF process. Preferred examples of a liquid crystal panel with the sealing member 81 provided on part of the periphery of the liquid crystal layer 30 include a liquid crystal panel produced by vacuum filling. The sealing members 80 and 81 are each a cured product of a photo-curable resin composition (ODF sealant or injection port sealant) containing a photo-radical polymerization initiator and a polymerizable monomer, and formed by irradiating the photo-curable resin composition with light (preferably ultraviolet light). In the case of employing vacuum filling, the liquid crystal display device of the present embodiment typically includes, as shown in FIG. 3, the sealing member 82 provided on a large part of the periphery of the liquid crystal layer 30 (the periphery of the liquid crystal layer 30 except for the liquid crystal injection ports). The sealing member 82 is typically a cured product of a thermosetting resin composition (thermosetting sealant) containing an epoxy-based monomer and an epoxy curing agent, and is formed by heating the thermosetting resin composition. The sealing member 82 therefore usually contains no radical polymerization initiator.

<Insulating Film>

As shown in FIG. 1, the liquid crystal display device of the present embodiment may further include an insulating film 70. The insulating film 70 may cover the pixel electrodes 50 and contain no polymer having an aromatic anhydride monomer unit. This configuration can easily prevent the aromatic polyimide-based alignment film 40 from coming into contact with any of the pixel electrodes 50 even when the aromatic polyimide-based alignment film 40 is formed on the first substrate 10.

The insulating film 70 preferably contains an inorganic material. Thereby, charge interaction (electron transfer) between the pixel electrodes 50 and the insulating film 70 can be effectively prevented. The details of the mechanism are described later. Such an inorganic material is preferably a silicon nitride or a silicon oxide. Thus, the insulating film 70 more preferably contains an inorganic material containing at least one of SiNx and SiOx (x's are the same as or different from each other, and each a real number falling within the range of $1 \leq x \leq 3$).

<Liquid Crystal Display Device>

The alignment mode (display mode) in the liquid crystal display device of the present embodiment is not particularly limited, and is preferably the twisted nematic (TN) mode, the electrically controlled birefringence (ECB) mode, the in-plane switching (IPS) mode, the fringe field switching (FFS) mode, the vertical alignment (VA) mode, or the vertical alignment twisted nematic (VATN) mode.

In particular, the liquid crystal display device of the present embodiment is preferably an FFS-mode liquid crystal display device. As shown in FIG. 1, the first substrate 10 may further include the counter electrode 60, and the aromatic polyimide-based alignment film 40, the counter electrode 60, the insulating film 70, and the pixel electrodes 50 may be disposed in the given order from the liquid crystal layer 30 side. This configuration can easily prevent the aromatic polyimide-based alignment film 40 from coming into contact with any of the pixel electrodes 50 in the FFS mode. The aromatic polyimide-based alignment film 40 is in contact with the counter electrode 60, but ions (anions) are not generated or very unlikely to be generated, differently from the case where the film is in contact with the pixel electrodes 50. The following gives the detailed description.

Figure 4:
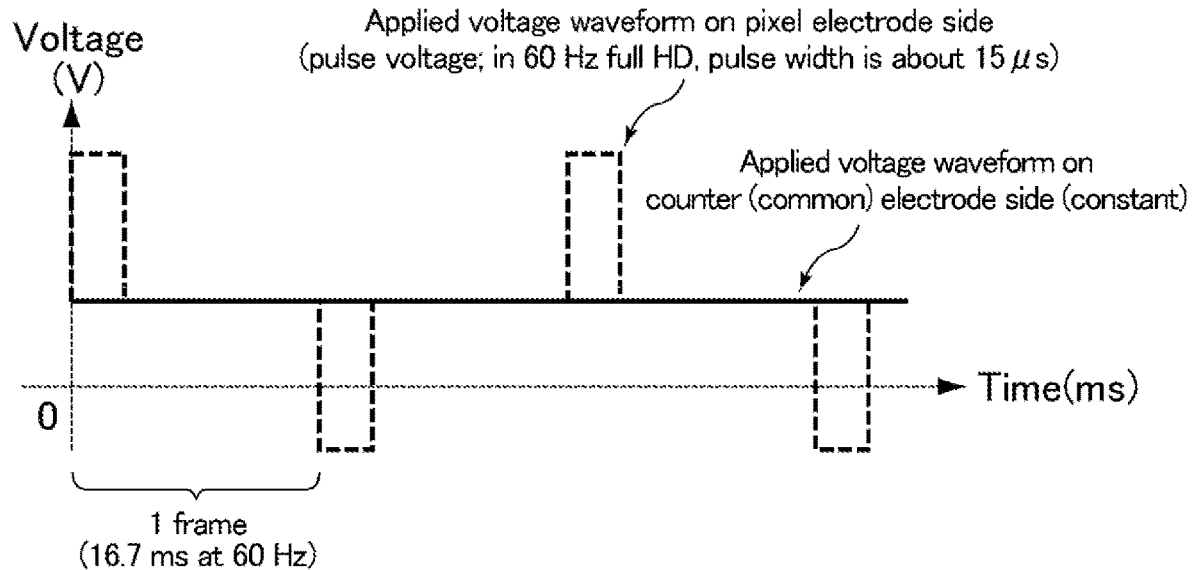
FIG. 4 is a schematic view of waveforms of voltage applied to a pixel electrode and a counter electrode in Embodiment 1.

FIG. 4 is a schematic view of waveforms of voltage applied to a pixel electrode and a counter electrode in Embodiment 1.

On the pixel electrode 50 side, square-wave voltage (pulse voltage) corresponding to the frequency and resolution is applied as shown in FIG. 4. The applied voltage is variable. In the case where the refresh rate is 60 Hz and the resolution is that of a full HD, the voltage application time per pulse is as short as 15 µs. Typically, when a pixel electrode is in contact with a dielectric, charge interaction occurs between free electrons and π-conjugated substances in molecules constituting the dielectric and the pixel electrode for a brief moment upon change in the applied voltage. For this reason, when the aromatic polyimide-based alignment film 40 containing a polymer having an aromatic anhydride monomer unit is in contact with a pixel electrode 50, electrons may flow from the pixel electrode 50 into the aromatic groups or conversely from the aromatic groups to the pixel electrode 50 upon change in the voltage level (see Formulas 4 and 5 above). If such electron transfer (redox reaction) continuously occurs during driving of the liquid crystal display device, aromatic groups in the aromatic anhydride monomer unit eventually generate ions, which deteriorates electrical characteristics (e.g., decreases VHR) of the liquid crystal display device. In contrast, in the case where the dielectric coming into contact with a pixel electrode 50, i.e., the insulating film 70, is made of a material (e.g., inorganic material) that is less likely to cause charge interaction, charge interaction (electron transfer) does not occur between the pixel electrode 50 and the inorganic material even upon change in the applied voltage, so that no ionization occurs.

On the counter (common) electrode 60 side, only constant voltage is typically applied. Such application of constant voltage causes no change in the applied voltage with time, so that the charge is immediately equilibrated between the electrode and the dielectric. Thus, the charge interaction between the electrode and the dielectric as shown in the formula 4, for example, does not occur, meaning that no redox reaction occurs. The counter electrode 60, even when in contact with the aromatic polyimide-based alignment film 40 containing an aromatic anhydride monomer unit polymer, does not cause or is very unlikely to cause ionization.

In the case of the FFS mode, as shown in FIG. 1, the pixel electrodes 50, the insulating film 70 (functioning as an interlayer insulating film) covering the pixel electrodes 50, and the counter electrode 60 formed on the insulating film 70 preferably constitute the FFS electrode structure, which generates an oblique electric field (fringe electric field) in the liquid crystal layer 30 when voltage is applied. Also in this case, the counter electrode 60 is a slit electrode. The slit electrode can be, for example, an electrode provided with linear slits surrounded entirely by the electrode portions, or a comb electrode including comb teeth with linear cuts (slits) between the comb teeth. The pixel electrodes 50 may each be a planar electrode formed in the entire corresponding pixel region or, as shown in FIG. 1, a slit electrode provided with slits. In the case where the pixel electrodes 50 are slit electrodes, the slits of the pixel electrodes 50 are formed such that the entire space of each slit of the counter electrode 60 is filled with an electrode portion of the pixel electrode 50 in a plan view.

In the case of the IPS mode, paired comb electrodes are disposed on at least one of the first substrate 10 and the second substrate 20 to generate transverse electric fields in the liquid crystal layer 30. The paired comb electrodes can be, for example, paired electrodes that are each provided with comb teeth and disposed such that the comb teeth of the electrodes mesh with each other. In this case, one of the comb electrodes functions as the pixel electrode 50 while the other of the comb electrodes functions as the counter electrode 60.

On the surface of each of the first substrate 10 and the second substrate 20 remote from the liquid crystal layer 30 may be disposed a polarizer (linear polarizer). Typical examples of the polarizer include those obtained by aligning a dichroic anisotropic material such as an iodine complex adsorbed on a polyvinyl alcohol (PVA) film. Generally, each surface of the PVA film is laminated with a protective film such as a triacetyl cellulose film before the film is put into practical use. An optical film such as a retardation film may be disposed between the polarizer and the first substrate 10 or the second substrate 20.

In the liquid crystal display device of the present embodiment, a backlight is disposed behind the liquid crystal panel. A liquid crystal display device having such a configuration is typically called a transmissive liquid crystal display device. The backlight may be any backlight that emits light including visible light, and may be one that emits light including only visible light or emits light including both visible light and ultraviolet light. In order to enable the liquid crystal display device to provide color display, the backlight preferably emits white light. The light source of the backlight may suitably be a light emitting diode (LED), for example.

The liquid crystal display device of the present embodiment has a structure including, as well as the liquid crystal panel and the backlight, components such as external circuits, including a tape-carrier package (TCP) and a printed circuit board (PCB); optical films, including a viewing angle-increasing film and a luminance-increasing film; and a bezel (frame). Some components may be incorporated into another component. In addition to the components described above, the liquid crystal display device may include any components that are usually used in the field of liquid crystal display devices. The detailed description for each of these additional components is therefore not provided herein.

Modified Example 1 of Embodiment 1

Figure 5:
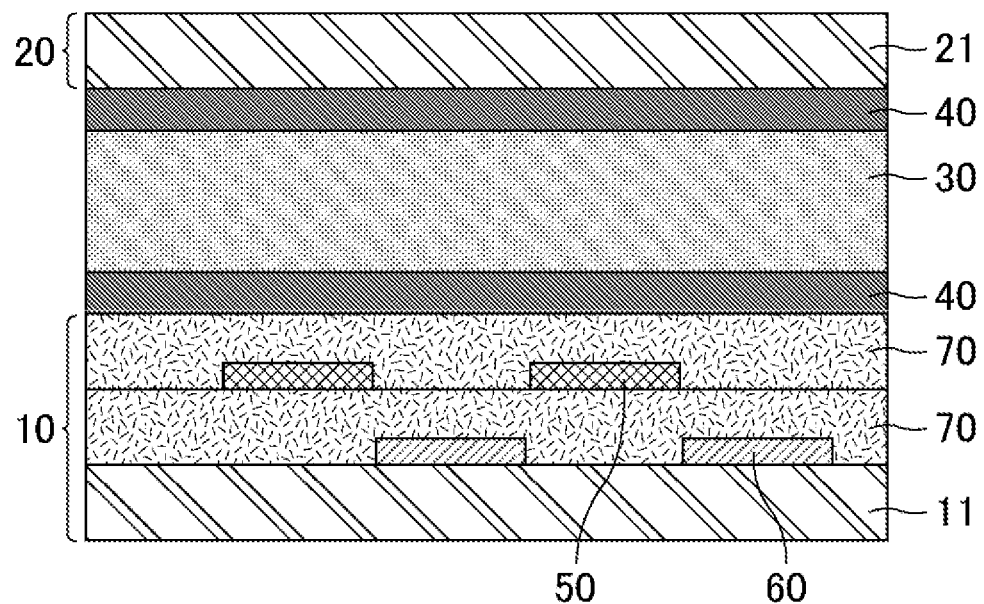
FIG. 5 is a schematic cross-sectional view of a liquid crystal display device according to Modified Example 1 of Embodiment 1.

FIG. 5 is a schematic cross-sectional view of a liquid crystal display device according to Modified Example 1 of Embodiment 1.

As shown in FIG. 5, in the present embodiment, the first substrate 10 or the second substrate 20 includes the counter electrode 60. The aromatic polyimide-based alignment film 40, the insulating film 70, and the pixel electrode 50 are disposed in the given order from the liquid crystal layer 30 side. The counter electrode 60 may be disposed at a position except between the aromatic polyimide-based alignment film 40 and the insulating film 70. This configuration can also easily prevent the aromatic polyimide-based alignment film 40 from coming into contact with any of the pixel electrodes 50.

The counter electrode 60 may be disposed at any position suitable for conditions such as the alignment mode. In the case of the FFS mode, for example, the counter electrode 60 may be disposed under the pixel electrodes 50 with the interlayer insulating film 70 in between as shown in FIG. 5. In this case, inversely to the case shown in FIG. 1, the pixel electrodes 50 are slit electrodes while the counter electrode 60 is a planar electrode or slit electrode. Also in the case of the IPS mode, for example, the counter electrode 60 may be disposed in the same layer as the pixel electrodes 50. In the case of the TN mode or a vertical alignment mode, for example, the counter electrode 60 may be disposed on the second substrate 20.

Modified Example 2 of Embodiment 1

Figure 6:
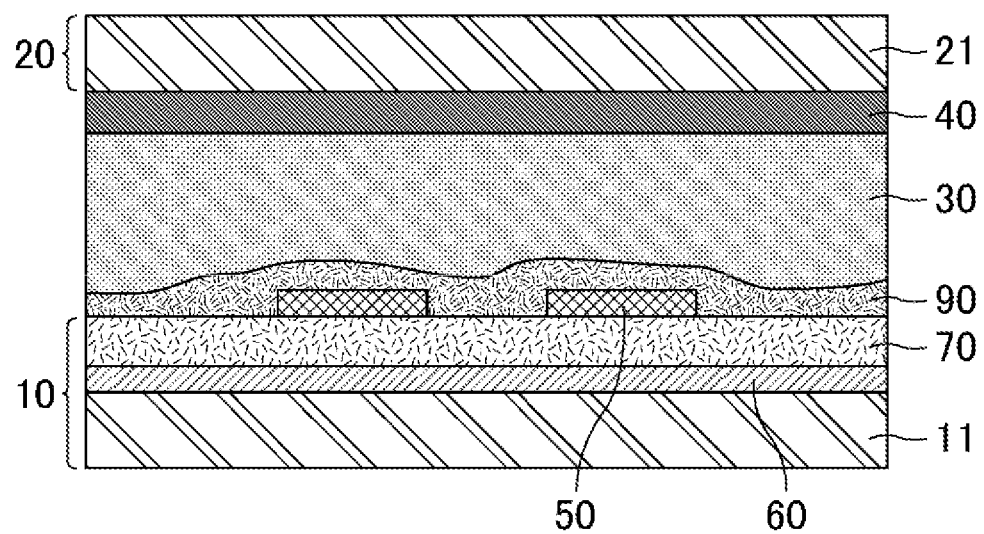
FIG. 6 is a schematic cross-sectional view of a liquid crystal display device according to Modified Example 2 of Embodiment 1.
Figure 7:
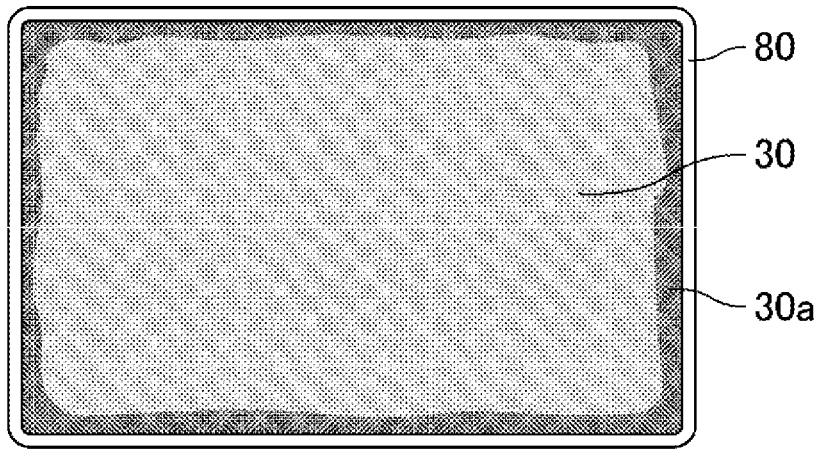
FIG. 7 is a schematic plan view of a liquid crystal display device produced by the ODF process, on which the present inventors made studies.
Figure 8:
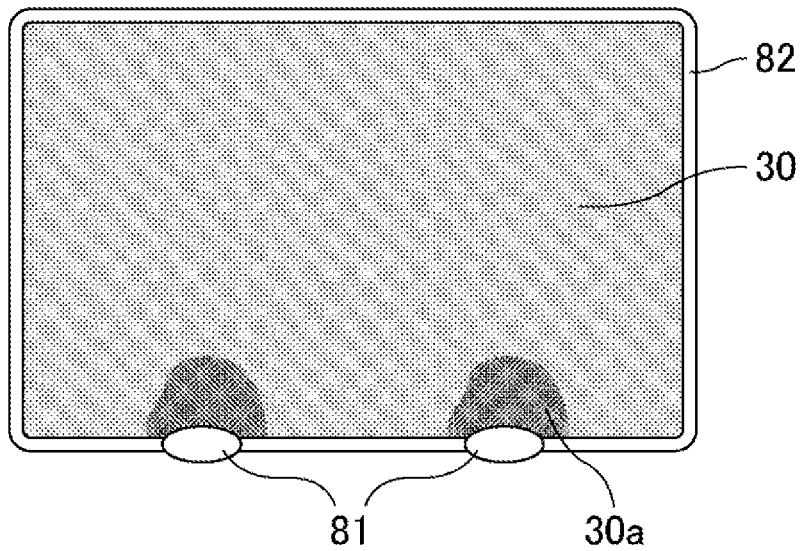
FIG. 8 is a schematic plan view of a liquid crystal display device produced by vacuum filling, on which the present inventors made studies.

FIG. 6 is a schematic cross-sectional view of a liquid crystal display device according to Modified Example 2 of Embodiment 1.

As shown in FIG. 6, the aromatic polyimide-based alignment film 40 is disposed not on the first substrate 10 but on the second substrate 20, the liquid crystal display device of the present embodiment further includes a second alignment film 90 on the first substrate 10, and the second alignment film 90 may contain no polymer having an aromatic anhydride monomer unit. Also in the present modified example, the aromatic polyimide-based alignment film 40 on the second substrate 20 can incorporate radicals generated by the radical generator. The second alignment film 90, containing no polymer having an aromatic anhydride monomer unit, does not cause the redox reaction described above with a pixel electrode 50 even when coming into contact with the pixel electrode 50.

The material of the second alignment film 90 may be any material except for the polymer having an aromatic anhydride monomer unit, and can be a common alignment film material. For example, the second alignment film 90 may contain at least one polymer selected from a polyimide and a polyamic acid, and the at least one polymer contained in the second alignment film 90 may have an aliphatic anhydride monomer unit.

Although FIG. 6 shows the case of employing the FFS mode with the FFS electrode structure, the present modified example can employ any of various alignment modes.

Some embodiments of the present invention have been described above. All the features in the embodiments are applicable to the whole aspects of the present invention.

The present invention is described in detail below based on examples and comparative examples. The examples, however, are not intended to limit the scope of the present invention.

Example 1

An FFS-mode liquid crystal cell was produced by the following method.

A TFT substrate and a counter substrate with no electrode were prepared. The TFT substrate had the electrode arrangement shown in FIG. 1. The insulating film (interlayer insulating film) 70 was formed from SiO. The pixel electrodes 50 and the counter electrode 60 were formed from ITO. To each substrate was applied a solvent containing a polyamic acid (weight average molecular weight: 10000 to 150000) having an aromatic anhydride monomer unit and represented by the following formula (A-1-1). The substrates were pre-baked at 80° C. for two minutes, and then post-baked at 230° C. for 40 minutes. Through the baking processes, aromatic polyimide-based alignment films (thickness: 60 to 110 nm) containing a polyimide represented by the following formula (A-1) were formed.

[Chem. 24]

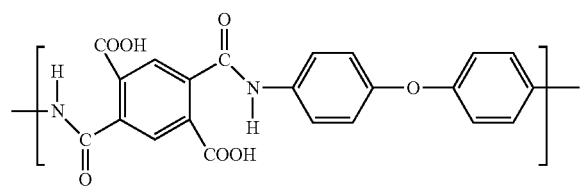

(A-1-1)

[Chem. 25]

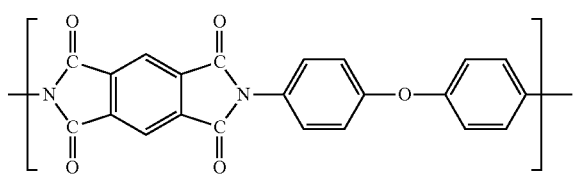
(A-1)

Each aromatic polyimide-based alignment film was subjected to rubbing. A thermosetting sealant was applied to one of the substrates and pre-cured at 100° C. The substrates were bonded to each other, followed by post-curing at 150° C. for 40 minutes. A liquid crystal material having a Tni (nematic-isotropic transition temperature of the liquid crystal material) of 95° C. to below 96° C. (the liquid crystal material exhibits the liquid crystal phase even at a temperature as low as −30° C.) was injected through the liquid crystal injection ports by vacuum filling. The liquid crystal material contained a liquid crystal compound with an alkenyl group.

To the liquid crystal injection ports was applied an injection port sealant containing an acrylic monomer and a photo-radical polymerization initiator. The injection port sealant was irradiated with ultraviolet light at an irradiation dose of 200 mJ/cm² and was thereby cured. The injection port sealant was then heated at 130° C. for 40 minutes for realignment treatment of the liquid crystal material. The workpiece was cooled down to room temperature, whereby an FFS-mode liquid crystal cell was obtained.

Comparative Example 1

An FFS-mode liquid crystal cell of Comparative Example 1 was produced as in Example 1, except that an alignment film material different from that used in Example 1 was used. In the present comparative example, a polyamic acid (weight average molecular weight: 10000 to 150000) having an aliphatic anhydride monomer unit and represented by the following formula (A-2-1) was used in place of the polyamic acid represented by the formula (A-1-1) in Example 1, and an alignment film (thickness: 60 to 110 nm) containing a polyimide represented by the following formula (A-2) was formed on each substrate.

[Chem. 26]

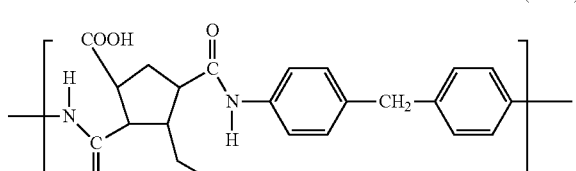
(A-2-1)

[Chem. 27]

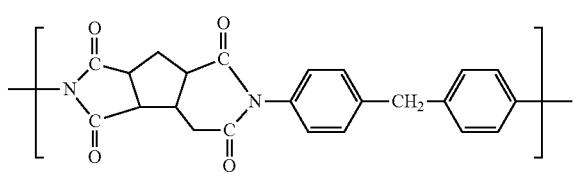
(A-2)

<High-Temperature Test on Backlight>

In order to evaluate the image sticking resistance of the FFS-mode liquid crystal cells produced in Example 1 and Comparative Example 1, each liquid crystal cell was left to stand on a backlight in a turn-on state in a 90° C. thermostatic bath for 1000 hours. The voltage holding ratio (VHR) and the residual DC voltage (rDC) were determined before and after the test. The results are shown in the following Table 1. The VHR was determined at 1 V and 70° C. using a VHR measurement system Model 6254 (Toyo Corp.). The residual DC voltage was determined by the flicker minimizing method after application of a DC voltage of 2 V for two hours.

TABLE 1

| | Before test | | After 1000-hour test | |
|---|---|---|---|---|
| | VHR (%) | rDC (mV) | VHR (%) | rDC (mV) |
| Example 1 | 99.5 | 0 | 98.3 | 10 |
| Comparative Example 1 | 99.5 | 0 | 96.8 | 50 |

Table 1 shows that Example 1, utilizing an aromatic polyimide-based alignment film containing a polyimide having an aromatic anhydride monomer unit represented by the formula (A-1), resulted in a higher VHR and a lower rDC after the 1000-hour test than those in Comparative Example 1. This is presumably because stable radicals generated by a reaction between the liquid crystal compound with an alkenyl group and unreacted moieties of the photo-radical polymerization initiator dissolved from the injection port sealant were effectively trapped to the surface of the aromatic polyimide-based alignment film containing a polyimide represented by the formula (A-1).

Example 2

An FFS-mode liquid crystal cell was produced by the following method.

A TFT substrate and a counter substrate with no electrode were prepared. The TFT substrate had the electrode arrangement shown in FIG. 1. The insulating film (interlayer insulating film) 70 was formed from SiN. The pixel electrodes 50 and the counter electrode 60 were formed from ITO. To each substrate was applied a solvent containing a polyamic acid (weight average molecular weight: 10000 to 150000) having an aromatic anhydride monomer unit and represented by the formula (A-1-1). The substrates were pre-baked at 80° C. for two minutes, and then post-baked at 230° C. for 40 minutes. Through the baking processes, aromatic polyimide-based alignment films (thickness: 60 to 110 nm) containing a polyimide represented by the formula (A-1) were formed.

Each aromatic polyimide-based alignment film was subjected to rubbing. An ODF sealant containing a photo-radical polymerization initiator was applied to one of the substrates. A liquid crystal material having a Tni of 97° C. to below 98° C. (the liquid crystal material exhibits the liquid crystal phase even at a temperature as low as −30° C.) was dropped onto the other substrate. The substrates were bonded to each other, and the ODF sealant was irradiated with ultraviolet light at an irradiation dose of 1000 mJ/cm². The liquid crystal material contained a liquid crystal compound with an alkenyl group.

The ODF sealant was then heated at 130° C. for 40 minutes for realignment treatment of the liquid crystal material. The workpiece was cooled down to room temperature, whereby an FFS-mode liquid crystal cell was obtained.

Comparative Example 2

Figure 9:
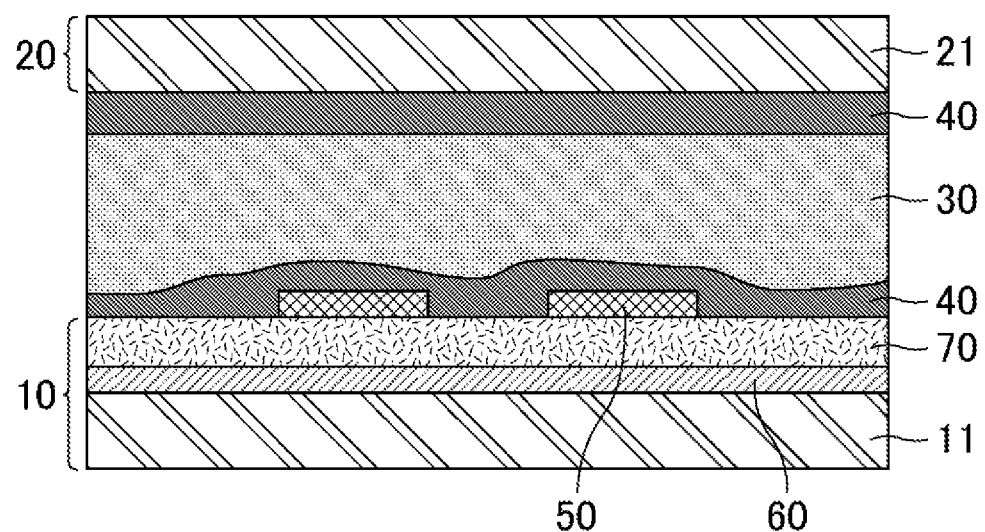
FIG. 9 is a schematic cross-sectional view of a liquid crystal display device according to Comparative Example 2.

An FFS-mode liquid crystal cell of Comparative Example 2 was produced as in Example 2, except that the electrode arrangement on the TFT substrate was different. FIG. 9 is a schematic cross-sectional view of a liquid crystal display device according to Comparative Example 2.

In Comparative Example 2, the positions of the pixel electrodes 50 and the counter electrode 60 in Example 2 were switched to produce an FFS-mode liquid crystal cell shown in FIG. 9 in which the aromatic polyimide-based alignment film 40 and the pixel electrodes 50 were in direct contact with each other.

Also in Comparative Example 2, the insulating film (interlayer insulating film) 70 was formed from SiN. The pixel electrodes 50 and the counter electrode 60 were formed from ITO.

<High-Temperature Test on Backlight>

The FFS-mode liquid crystal cells produced in Example 2 and Comparative Example 2 were subjected to evaluation as in the above examples such as Example 1. The results thereof are shown in the following Table 2.

TABLE 2

|  | Before test | | After 1000-hour test | |
| --- | --- | --- | --- | --- |
|  | VHR (%) | rDC (mV) | VHR (%) | rDC (mV) |
| Example 2 | 99.5 | 0 | 98.4 | 10 |
| Comparative Example 2 | 99.5 | 0 | 95.3 | 90 |

In the FFS-mode liquid crystal cell produced by the ODF process having the electrode structure in Comparative Example 2 shown in FIG. 9, the pixel electrodes for voltage application are in direct contact with the alignment film. This causes charge transfer between the pixel electrodes and the alignment film, leading to the redox reaction due to charge transfer between the benzene ring and the carbonyl group as shown in Formula 5. As a result, dianions are generated inside the alignment film, so that a great VHR decrease and great rDC generation occur as compared with the electrode structure shown in FIG. 1. In contrast, in the electrode structure of Example 2 shown in FIG. 1, the pixel electrodes for voltage application and the alignment film are not in direct contact with each other and thus the redox reaction between the alignment film and the pixel electrodes is avoided. Example 2 therefore resulted in a high VHR and a low rDC voltage after the 1000-hour test.

Examples 3-1 to 3-4

FFS-mode liquid crystal cells of Examples 3-1 to 3-4 were produced as in Example 1, except that the irradiation dose of ultraviolet light applied to the injection port sealant was changed to 0 mJ/cm$^2$ (i.e., no ultraviolet light irradiation), 50 mJ/cm$^2$, 100 mJ/cm$^2$, or 200 mJ/cm$^2$ and the insulating film (interlayer insulating film) 70 was formed from SiN.

<High-Temperature Test on Backlight>

The FFS-mode liquid crystal cells produced in Examples 3-1 to 3-4 were subjected to evaluation as in the above examples such as Example 1, and the results thereof are shown in the following Table 3.

TABLE 3

|  | Ultraviolet irradiation dose for injection port sealant (mJ/cm$^2$) | Before test | | After 1000-hour test | |
| --- | --- | --- | --- | --- | --- |
|  |  | VHR (%) | rDC (mV) | VHR (%) | rDC (mV) |
| Example 3-1 | 0 | 98.4 | 10 | 96.2 | 40 |
| Example 3-2 | 50 | 98.8 | 10 | 96.7 | 40 |
| Example 3-3 | 100 | 99.5 | 0 | 98.0 | 10 |
| Example 3-4 | 200 | 99.5 | 0 | 98.8 | 10 |

Table 3 shows that varying the irradiation dose of ultraviolet light for the injection port sealant led to differences in VHR and rDC voltage between the initial stage (0 hours) and after the 1000-hour test. As the irradiation dose of ultraviolet light decreased, the VHR decreased and the rDC voltage increased. These results show that the uncured components in the injection port sealant dissolved into the liquid crystal layer to cause the decrease in VHR and increase in rDC voltage. In particular, presumably, when the unreacted moieties of the photo-radical polymerization initiator dissolved into the liquid crystal layer, the unreacted moieties reacted with the liquid crystal compound with an alkenyl group in the liquid crystal material, forming stable radicals in the liquid crystal layer and thus causing a decrease in VHR and increase in rDC voltage. Still, since the VHR was comparatively high and the rDC voltage was comparatively low even at an ultraviolet light irradiation dose of 0 mJ/cm$^2$, radicals were presumed to be effectively trapped to the surface of the aromatic polyimide-based alignment film containing a polyimide represented by the formula (A-1).

Examples 4-1 to 4-4 and Comparative Example 3

FFS-mode liquid crystal cells of Examples 4-1 to 4-4 and Comparative Example 3 were produced as in Example 1, except that the following conditions were changed. The polyamic acid represented by the formula (A-1-1) used in Example 1 was changed to a polyamic acid (weight average molecular weight: 10000 to 150000) represented by the following formula (A-3-1), and an aromatic polyimide-based alignment film containing a polyimide represented by the following formula (A-3) was formed on each substrate. The liquid crystal cell of each of the Examples 4-1 to 4-4 and Comparative Example 3 was produced by changing m in the polyimide represented by the following formula (A-3) to 0, 0.25, 0.50, 0.75, or 1.0. The liquid crystal material used had a Tni of 95° C. or higher (the liquid crystal material exhibited the liquid crystal phase even at a temperature as low as −30° C.) The injection port sealant used contained a methacrylic monomer and a photo-radical polymerization initiator. The insulating film was formed from SiN.

[Chem. 28]

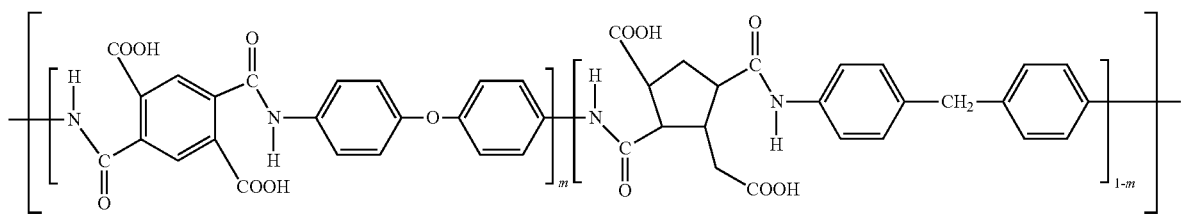

(A-3-1)

[Chem. 29]

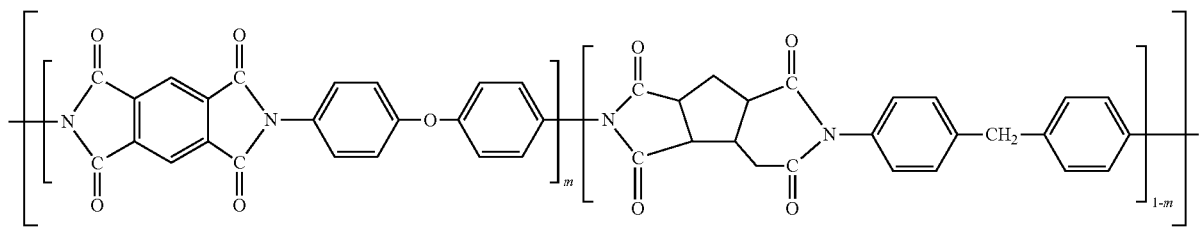

(A-3)

<High-Temperature Test on Backlight>

The FFS-mode liquid crystal cells produced in Examples 4-1 to 4-4 and Comparative Example 3 were subjected to evaluation as in the above examples such as Example 1. The results thereof are shown in the following Table 4.

TABLE 4

|  |  | Before test | | After 1000-hour test | |
| --- | --- | --- | --- | --- | --- |
|  |  | VHR (%) | rDC (mV) | VHR (%) | rDC (mV) |
| Comparative Example 3 | m = 0 | 99.5 | 0 | 96.6 | 50 |
| Example 4-1 | m = 0.25 | 99.5 | 0 | 98.2 | 10 |
| Example 4-2 | m = 0.50 | 99.5 | 0 | 98.3 | 10 |
| Example 4-3 | m = 0.75 | 99.5 | 0 | 98.4 | 10 |
| Example 4-4 | m = 1.0 | 99.5 | 0 | 98.8 | 10 |

Table 4 shows that the aromatic anhydride monomer unit, when accounting for 20 mol % or more (preferably 25 mol % or more) of all anhydride monomer units, can effectively reduce a decrease in VHR and generation of rDC voltage and minimize image sticking and stains, in long-term use at high temperatures.

[Additional Remarks]

One aspect of the present invention may be a liquid crystal display device including: a first substrate including a pixel electrode; a second substrate facing the first substrate; a liquid crystal layer sandwiched between the first substrate and the second substrate; an aromatic polyimide-based alignment film disposed on at least one of the first substrate and the second substrate; and a radical generator capable of supplying a radical to the liquid crystal layer upon being irradiated with light, the liquid crystal layer containing a liquid crystal compound with an alkenyl group, the aromatic polyimide-based alignment film containing at least one polymer selected from a polyimide and a polyamic acid and being in no contact with the pixel electrode, the at least one polymer containing an aromatic tetracarboxylic dianhydride monomer unit.

In use of a liquid crystal compound with an alkenyl group in the liquid crystal display device of the above aspect, the aromatic polyimide-based alignment film containing a polymer having an aromatic anhydride monomer unit is insulated from the pixel electrodes. Thereby, a redox reaction between them can be reduced while radicals of the liquid crystal compound with an alkenyl group are trapped by the aromatic groups on the aromatic polyimide-based alignment film. As a result, a favorable VHR and a low residual DC voltage can be retained in long-term use at high temperatures.

The radical generator may generate a radical upon being irradiated with ultraviolet light or visible light.

The liquid crystal display device of the above aspect may further include a sealing member that contains the radical generator and seals the liquid crystal layer, wherein the sealing member may be disposed on the entire or part of the periphery of the liquid crystal layer. The liquid crystal display device of the present aspect is suitable for production of a liquid crystal display device by ODF or vacuum filling.

The radical generator may be contained in the liquid crystal layer. The liquid crystal display device of the present aspect is suitable for production of a liquid crystal display device utilizing the PSA technique.

The liquid crystal layer may be in a liquid crystal phase within a temperature range of −30° C. to 90° C. The present aspect is suitable for in-vehicle uses which require a liquid crystal phase in a wide range of temperatures.

The first substrate may further include an insulating film, the aromatic polyimide-based alignment film may be disposed at least on the first substrate, and the insulating film may cover the pixel electrode and contain no polymer containing an aromatic tetracarboxylic dianhydride monomer unit. The present aspect allows easy insulation of the aromatic polyimide-based alignment film from the pixel electrodes.

The liquid crystal display device may be a fringe field switching (FFS)-mode liquid crystal display device, the first substrate may further include a counter electrode, and the aromatic polyimide-based alignment film, the counter electrode, the insulating film, and the pixel electrode may be disposed in the given order from the liquid crystal layer side.

The present aspect allows easy insulation of the aromatic polyimide-based alignment film from the pixel electrodes in the FFS mode.

The first substrate or the second substrate may include a counter electrode, the aromatic polyimide-based alignment film, the insulating film, and the pixel electrode may be disposed in the given order from the liquid crystal layer side, and the counter electrode may be disposed at a position except between the aromatic polyimide-based alignment film and the insulating film. The present aspect allows easy insulation of the aromatic polyimide-based alignment film from the pixel electrodes in various alignment modes.

The insulating film may contain an inorganic material. The present aspect allows effective prevention of deterioration in electric characteristics due to charge interaction (electron transfer) between the pixel electrodes and the insulating film.

The inorganic material may contain at least one of SiNx and SiOx, where x's are the same as or different from each other and each a real number falling within the range of $1 \leq x \leq 3$.

The liquid crystal display device of the above aspect may further include a second alignment film on the first substrate, wherein the aromatic polyimide-based alignment film may be formed not on the first substrate but on the second substrate, and the second alignment film may contain no polymer containing an aromatic tetracarboxylic dianhydride monomer unit. The present aspect can employ any alignment mode.

The liquid crystal layer may contain, as a liquid crystal compound with an alkenyl group, at least one liquid crystal compound selected from the group consisting of liquid crystal compounds represented by the above formulas (D-1) to (D-4).

The at least one polymer contained in the aromatic polyimide-based alignment film may be a copolymer containing the aromatic tetracarboxylic dianhydride monomer unit and an aliphatic tetracarboxylic dianhydride monomer unit.

The aromatic tetracarboxylic dianhydride monomer unit in the copolymer may account for 20 mol % or more of all anhydride monomer units.

The at least one polymer contained in the aromatic polyimide-based alignment film may contain at least one chemical structure selected from the group consisting of chemical structures represented by the above formulas (X-1) to (X-6) in the aromatic tetracarboxylic dianhydride monomer unit. In the formulas (X-1) to (X-6), at least one of hydrogen atoms may be replaced by a halogen, methyl, or ethyl group.

The second alignment film may contain at least one polymer selected from a polyimide and a polyamic acid, and the at least one polymer contained in the second alignment film may have an aliphatic anhydride monomer unit.

The aspects of the present invention described above may appropriately be combined within the spirit of the present invention.

REFERENCE SIGNS LIST

10: First substrate
20: Second substrate
11, 21: Transparent substrate
30: Liquid crystal layer
30a: Display unevenness
40: Aromatic polyimide-based alignment film
50: Pixel electrode
60: Counter electrode
70: Insulating film
80: ODF sealing member
81: Liquid crystal injection port sealing member
82: Vacuum filling sealing member
90: Second alignment film

The invention claimed is:

1. A liquid crystal display device comprising:
   a first substrate including a pixel electrode;
   a second substrate facing the first substrate;
   a liquid crystal layer sandwiched between the first substrate and the second substrate;
   an aromatic polyimide-based alignment film disposed on at least one of the first substrate and the second substrate; and
   a radical generator contained in the liquid crystal layer and/or a sealing member, and capable of supplying a radical to the liquid crystal layer upon being irradiated with light,
   the liquid crystal layer containing a liquid crystal compound with an alkenyl group,
   the aromatic polyimide-based alignment film containing a copolymer represented by the following formula (A-3) and being in no contact with the pixel electrode:

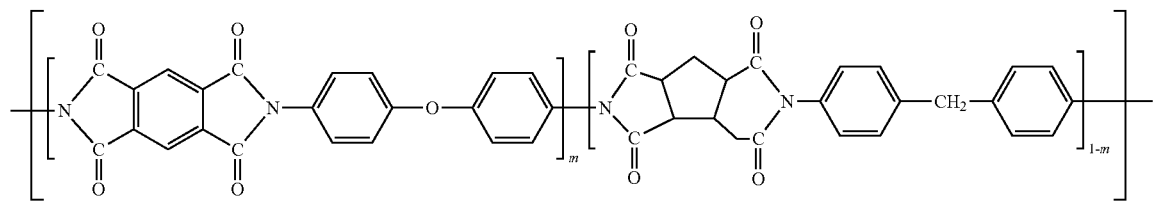

(A-3)

wherein m is a real number falling within the range of $0 < m < 1$.

2. The liquid crystal display device according to claim 1, wherein the radical generator generates a radical upon being irradiated with ultraviolet light or visible light.

3. The liquid crystal display device according to claim 1, further comprising a sealing member that contains the radical generator and seals the liquid crystal layer, wherein the sealing member is disposed on the entire or part of the periphery of the liquid crystal layer.

4. The liquid crystal display device according to claim 1, wherein the radical generator is contained in the liquid crystal layer.

5. The liquid crystal display device according to claim 1, wherein the liquid crystal layer is in a liquid crystal phase within a temperature range of −30° C. to 90° C.

6. The liquid crystal display device according to claim 1, wherein the first substrate further includes an insulating film,
the aromatic polyimide-based alignment film is disposed at least on the first substrate, and
the insulating film covers the pixel electrode and contains no polymer containing an aromatic tetracarboxylic dianhydride monomer unit.

7. The liquid crystal display device according to claim 6, wherein the liquid crystal display device is a fringe field switching (FFS)-mode liquid crystal display device,
the first substrate further includes a counter electrode, and
the aromatic polyimide-based alignment film, the counter electrode, the insulating film, and the pixel electrode are disposed in the given order from the liquid crystal layer side.

8. The liquid crystal display device according to claim 6, wherein the first substrate or the second substrate includes a counter electrode,
the aromatic polyimide-based alignment film, the insulating film, and the pixel electrode are disposed in the given order from the liquid crystal layer side, and
the counter electrode is disposed at a position except between the aromatic polyimide-based alignment film and the insulating film.

9. The liquid crystal display device according to claim 6, wherein the insulating film contains an inorganic material.

10. The liquid crystal display device according to claim 9, wherein the inorganic material contains at least one of SiNx and SiOx, where x's are the same as or different from each other and each a real number falling within the range of $1 \leq x \leq 3$.

11. The liquid crystal display device according to claim 1, wherein the aromatic polyimide-based alignment film is a first alignment film and is disposed not on the first substrate but on the second substrate,
the liquid crystal display device further comprises a second alignment film on the first substrate, and
the second alignment film contains no polymer containing an aromatic tetracarboxylic dianhydride monomer unit.

12. The liquid crystal display device according to claim 1, wherein the liquid crystal layer contains, as a liquid crystal compound with an alkenyl group, at least one liquid crystal compound selected from the group consisting of liquid crystal compounds represented by the following formulas (D-1) to (D-4):

[Chem. 1]

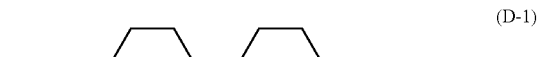

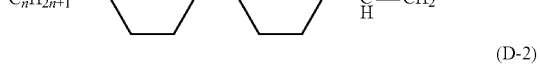

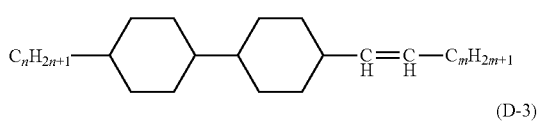

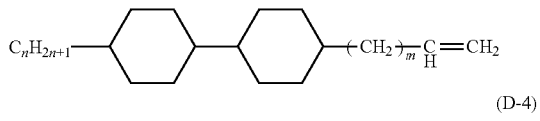

wherein m and n are the same as or different from each other and each an integer of 1 to 6.

13. The liquid crystal display device according to claim 1, wherein m in the formula (A-3) is a real number falling within the range of $0.25 \leq m < 1$.

* * * * *